United States Patent
Xu et al.

(10) Patent No.: US 10,660,085 B2
(45) Date of Patent: May 19, 2020

(54) APPARATUS AND METHOD FOR TRANSMITTING A RANGING PACKET COMPATIBLE WITH LEGACY 802.11 SYSTEMS

(71) Applicant: Apple Inc., Cupertino, CA (US)

(72) Inventors: Mingguang Xu, San Jose, CA (US); Su Khiong Yong, Palo Alto, CA (US); Mithat C. Dogan, San Jose, CA (US); Rohit U. Nabar, Sunnyvale, CA (US); Qi Wang, Sunnyvale, CA (US); Kyle C. Brogle, San Francisco, CA (US); Andrew J. Ringer, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 103 days.

(21) Appl. No.: 15/937,365

(22) Filed: Mar. 27, 2018

(65) Prior Publication Data
US 2019/0037549 A1     Jan. 31, 2019

Related U.S. Application Data

(60) Provisional application No. 62/596,690, filed on Dec. 8, 2017, provisional application No. 62/537,831, filed on Jul. 27, 2017.

(51) Int. Cl.
*H04W 72/04* (2009.01)
*H04W 64/00* (2009.01)
(Continued)

(52) U.S. Cl.
CPC ......... *H04W 72/044* (2013.01); *H04L 25/022* (2013.01); *H04L 25/0204* (2013.01);
(Continued)

(58) Field of Classification Search
CPC ...... H04W 64/00; H04W 84/12; H04W 48/08
See application file for complete search history.

(56) References Cited

U.S. PATENT DOCUMENTS 6,931,030 B1 * 8/2005 Dogan ................ H04L 7/041
                                                    370/278
10,218,822 B2 * 2/2019 Zhang ................ H04L 69/22
(Continued)

OTHER PUBLICATIONS

Extended European Search Report directed to related European Patent Application No. 18203771.3, dated May 9, 2019; 9 pages.
(Continued)

*Primary Examiner* — Shukri Taha
(74) *Attorney, Agent, or Firm* — Sterne, Kessler, Goldstein & Fox P.L.L.C.

(57) ABSTRACT

Communicating wireless devices collaborate and utilize waveforms to enable secure channel estimation. To protect against a repetitive replay attack, some embodiments include Single Carrier Physical Layer (SC-PHY) waveforms and/or interpolated OFDM waveforms that do not include a repeatable or predictable structure. The waveforms are transmitted in ranging packet structures that are compatible with legacy 802.11 technologies that do not utilize secure channel estimation. The ranging packets are received in combination with the information previously exchanged to enable the receiving wireless system to securely determine a channel estimate (e.g., determine a channel estimate without an interloper transmission that is not an authentic first arrival path in a multi-path channel between the wireless systems). Thus, one or both of the wireless systems can estimate the distance between them (or range). Devices utilizing legacy 802.11 technologies may receive the ranging packet structures and determine durations for deferring access to the channel.

23 Claims, 21 Drawing Sheets

(51) Int. Cl.
 H04L 25/02 (2006.01)
 H04W 84/12 (2009.01)
 H04L 5/00 (2006.01)
(52) U.S. Cl.
 CPC ......... H04L 25/0224 (2013.01); H04W 64/00 (2013.01); H04L 5/0048 (2013.01); H04W 84/12 (2013.01)

(56) References Cited

U.S. PATENT DOCUMENTS

| | | |
|---|---|---|
| 2012/0044925 A1 | 2/2012 | Lee et al. |
| 2012/0113955 A1* | 5/2012 | Cho ................... H04W 48/08 370/330 |
| 2013/0128806 A1* | 5/2013 | Vermani ............... H04L 1/0028 370/328 |
| 2016/0119452 A1* | 4/2016 | Lee ........................ H04L 69/22 370/338 |
| 2016/0173662 A1 | 6/2016 | Seok |
| 2016/0202350 A1* | 7/2016 | Jose ....................... H04L 27/26 370/328 |
| 2017/0257762 A1 | 9/2017 | Ginzboorg et al. |

OTHER PUBLICATIONS

Wang et al., "Secure Channel Estimation Method in TDD OFDM Systems," IEEE International Symposium on Broadband Multimedia Systems and Broadcasting (BMSB), Jun. 1, 2016; 4 pages.

* cited by examiner

APPARATUS AND METHOD FOR TRANSMITTING A RANGING PACKET COMPATIBLE WITH LEGACY 802.11 SYSTEMS

CROSS-REFERENCE TO RELATED APPLICATIONS

This application claims the benefit of U.S. Provisional Application No. 62/596,690, titled Ranging Packet Compatible with Legacy 802.11 Systems, filed Dec. 8, 2017, and claims the benefit of U.S. Provisional Application No. 62/537,831, titled Wireless Ranging System with Secure Channel Estimation, filed Jul. 27, 2017, both of which are incorporated herein by reference in their entireties.

BACKGROUND

Field

The described embodiments generally relate to secure channel estimation and compatibility with legacy 802.11 systems in wireless communications.

Related Art

Wireless communication systems that utilize predictable and repetitive structures (e.g., Cyclic Prefix Orthogonal Frequency-Division Multiplexing (CP-OFDM) and Golay sequences) are vulnerable to attacks that can result in poor quality and/or disruption of service. For example, a hacker device may be used by an entity that is not engaged in secure ranging but attempts to tamper with time of arrival (ToA) measurement/measurement reports exchanged by entities engaged in secure ranging. A hacker device can listen to a wireless transmission—e.g., from an initiator station to a responder station—that utilizes a cyclic prefix (CP). The hacker device may transmit interloper signals that are received at the responder station that result in incorrect calculations of ranges (e.g., distances) between the initiator and responder stations. Range calculations can be based on round trip time (RTT) derived from a time of arrival (ToA) and a time of departure (ToD). ToA can be derived from a multi-path channel estimation based on pilots. Thus, channel estimations that rely on a repetitive structure are vulnerable to adversarial attacks. In addition, a variety of devices communicating via legacy 802.11 technologies may exist within the same frequency bands, and may interfere with communications for secure ranging.

SUMMARY

Some embodiments include an electronic device, method, and computer program product for transmitting and receiving waveforms that enable secure channel estimation. In some embodiments, the waveforms do not include repetitive or predictive structures that would be vulnerable to security issues—e.g., a hacker device deciphering a wireless transmission between a transmitting system and a receiving system. Thus, the hacker device would be unable to generate and transmit an interloper transmission to spoof the receiving system. Without the interloper transmission, the receiving system can securely calculate a channel estimation based on the received wireless transmission and determine the range between the receiving system and the transmitting system.

Some embodiments include an electronic device for receiving waveforms enabling secure channel estimation. Before a ranging process between the electronic device and a second electronic device begins, some embodiments include receiving one or more core symbols from the other electronic device, where each of the one or more core symbols includes a different training sequence that may represent a password code, for example. Some embodiments include receiving a symbol with a zero prefix, a core symbol of the one or more core symbols, and a zero postfix. The length of the zero postfix can equal a guard interval, and the length of the zero postfix can equal the length of the zero prefix. In some embodiments, a sum of the length of the core symbol and the length of the zero postfix equals a size of a Discrete Fourier Transform (DFT) analysis window of the receiving system. Based at least on the symbol received, some embodiments include determining a range or distance of the electronic device from the other electronic device. The range may be an estimated range.

Some embodiments include wireless ranging systems that generate, transmit, and receive ranging packets that include the waveforms that enable secure channel estimation. The ranging packet structures may be compatible with legacy 802.11 systems, where legacy 802.11 systems include for example, IEEE 802.11 systems prior to IEEE 802.11az. When a ranging packet structure is transmitted, devices supporting legacy 802.11 technologies may receive the ranging packet structure, determine the duration of the ranging packet structure, and then defer their channel access accordingly. The determination may be based at least on one or more fields of the preamble of the ranging packet structure.

Some embodiments include an electronic device for transmitting a ranging packet structure with a waveform that enables secure channel estimation. The electronic device may include a memory and one or more processors (herein "processors") communicatively coupled to the memory. Before the ranging process begins, the processors may receive one or more core symbols from a second electronic device, where each of the core symbols includes a different training sequence. The processors may generate a ranging packet structure that includes the waveform that enables secure channel estimation. The ranging packet structure is compatible with legacy 802.11 systems, and the processors may transmit the ranging packet. The ranging packet may be received by the second electronic device that is engaging in secure ranging with the electronic device, and/or received a third electronic device. The third electronic device may determine from a preamble of the ranging packet structure, how long the third electronic device should defer access to the channel. Thus, the third electronic device does not interfere with the secure ranging communications.

In some embodiments the waveform includes a symbol that includes a zero prefix, a core symbol of the one or more core symbols, and a zero postfix. A length of the zero postfix may equal a guard interval, the length of the zero postfix may equal a length of the zero prefix, and a sum of a length of the core symbol and the length of the zero postfix may equals size of a Discrete Fourier Transform (DFT) analysis window.

The processors of the electronic device may also determine a WiFi transmission frequency at 2.4 GHz or 5 GHz, and select a high throughput (HT) physical layer, where the waveform replaces a high throughput long training field (HT-LTF). The HTz ranging packet structure may include a legacy preamble, a high throughput signal field (HT-SIG), and a high throughput short training field (HT-STF). For a 40

MHz bandwidth channel, the HTz ranging packet structure the legacy preamble and HT-SIG are duplicated over each 20 MHz channel of the 40 MHz bandwidth. The processors may select a very high throughput (VHT) physical layer, where the waveform replaces a very high throughput long training field (VHT-LTF). A VHTz ranging packet structure includes a legacy preamble, a very high throughput signal field A (VHT-SIGA), and a very high throughput short training field (VHT-STF). A very high throughput signal field B (VHT-SIGB) may be omitted. For a VHTz ranging packet structure with a 40/80/160 MHz channel bandwidth, the legacy preamble and the VHT-SIGA are duplicated over each 20 MHz channel of the 40/80/160 MHz bandwidth. The processors may select a high efficiency (HE) physical layer, where the waveform replaces a high efficiency long training field (HE-LTF). The HEz ranging packet structure includes a legacy preamble, a repeated legacy signal field (RL-SIG), high efficiency signal field A (HE-SIGA), and high efficiency short training field (HE-STF). An HEz ranging packet structure for a 40/80/160 MHz bandwidth duplicates the legacy preamble, RL-SIG, and HE-SIGA over each 20 MHz channel of the 40/80/160 MHz bandwidth.

When the processors determine a WiFi transmission frequency at 60 GHz, the processors may select a directional multi gigabit (DMG) physical layer, where the waveform follows an 801.11ad control physical layer preamble that includes a legacy header (L-Header). The processors may select an enhanced directional multi gigabit (EDMG) physical layer, where the waveform replaces an enhanced directional multi gigabit channel estimation field (EDMG-CEF). An EDMGz ranging packet structure includes an 801.11ad control physical layer preamble, an EDMG-Header-A, and an EDMG short training field (EDMG-STF). For an EDMGz ranging packet structure with a 4.32/6.48/8.64 GHz channel bandwidth, the 801.11ad control physical layer preamble, the EDMG-Header-A, and the EDMG-STF are duplicated over each 2.16 GHz channel of the 4.32/6.48/8.64 GHz bandwidth.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1:
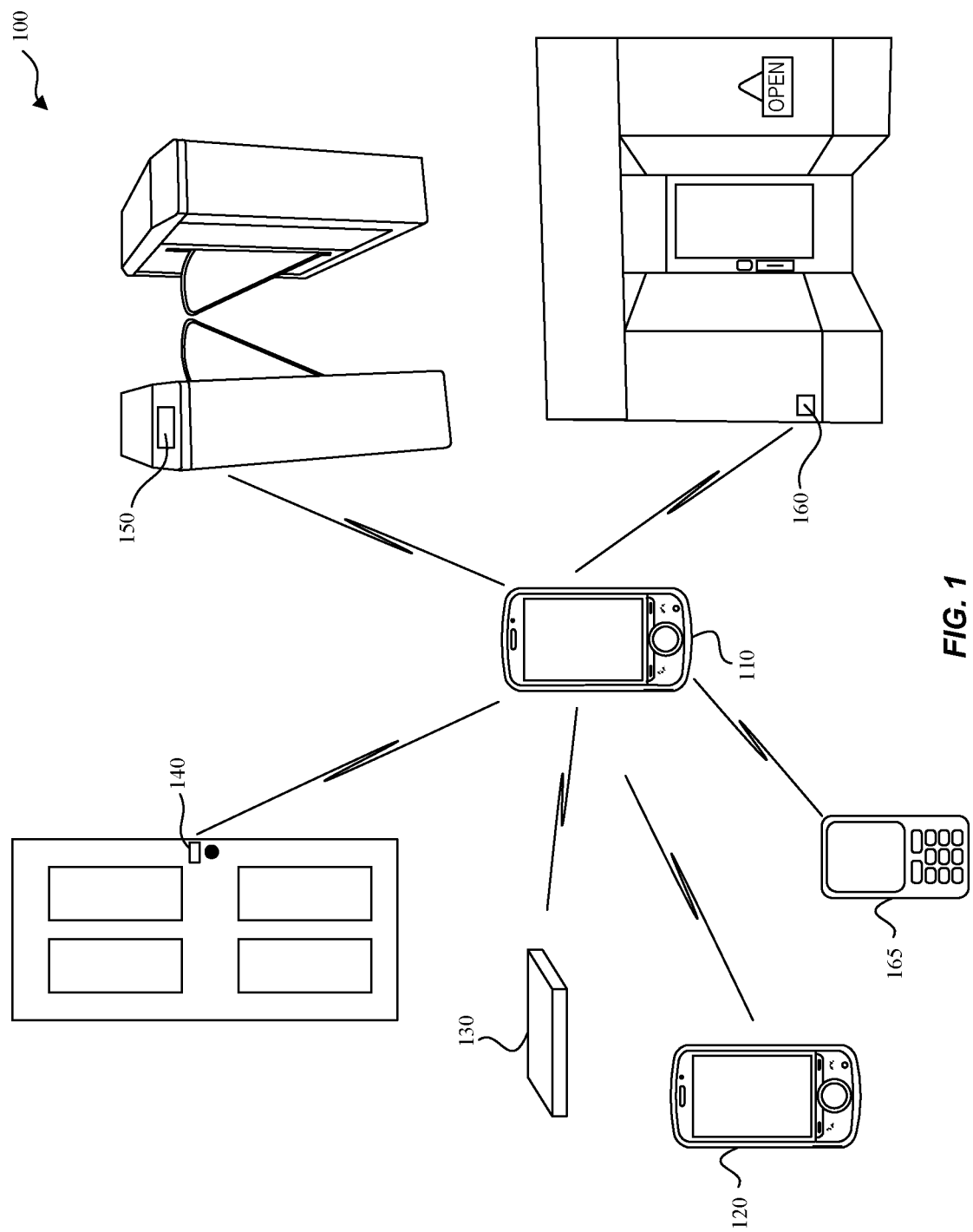
FIG. 1 illustrates an example system implementing waveform systems for secure channel estimation and ranging packet structures, according to some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments enable communicating wireless devices to collaborate with each other and utilize waveforms that enable secure channel estimation, which is important to secure ranging. To protect against a repetitive replay attack, some embodiments include Single Carrier Physical Layer (SC-PHY) waveforms and/or interpolated OFDM waveforms that do not include a repeatable or predictable structure.

Before a ranging process begins, information (e.g., a random sequence) is securely exchanged from one wireless system to another wireless system. The information exchanged supports the waveform structures that one wireless system transmits in a ranging packet to another when the ranging process begins. The ranging packet (containing the waveform structures) received and the information previously exchanged by the wireless systems enable a receiving wireless system to securely determine channel estimation (e.g., determine channel estimation without an interloper transmission that is not an authentic first arrival path in a multi-path channel between the wireless systems). Thus, the wireless systems can securely determine the distance between each other.

In addition, devices supporting legacy 802.11 systems may also receive the ranging packet that is compatible with the legacy 802.11 systems. For example, legacy 802.11 systems may not support waveform systems for secure channel estimation, and may include IEEE 802.11 technologies prior to IEEE 802.11az. A device supporting legacy 802.11 systems that receives the ranging packet can determine the duration of the ranging packet and hence determine a time duration for deferring channel access. This allows the wireless systems engaged in ranging to gain control of the channel. The ranging packet includes ranging packet structures that are compatible with legacy 802.11 systems.

FIG. 1 illustrates an example system 100 implementing waveform systems for secure channel estimation, according to some embodiments of the disclosure. Example system 100 is provided for the purpose of illustration only and is not limiting of the disclosed embodiments. System 100 may include but is not limited to wireless communication devices 110, 120, vehicular transponder device 130, entry transponder device 140, ticket entry device 150, and proximity detection device 160. Other devices that may benefit from some or all of the embodiments—which are not shown in FIG. 1 for simplicity purposes—may include other computing devices including but not limited to laptops, desktops, tablets, personal assistants, routers, monitors, televisions, printers, household devices (e.g., thermostat), and appliances. Example uses may include access to a device once in proximity.

When wireless communication device 110 is in proximity (e.g., a hundred meters) to vehicular transponder device 130 or entry transponder device 140, some embodiments may enable a corresponding car door or entry (e.g., entry of a door to a house, an office, or a building) to be unlocked or opened. Likewise, when wireless communication device 110 is in proximity of ticket entry device 150, some embodiments allow a ticket (e.g., a concert ticket, a metro rail ticket, or a sport event ticket) associated with wireless communication device 110 to be recognized, validated, and allow a ticket holder (via wireless communication device 110) entry to the venue. Ticket entry device 150 may include other implementations including but not limited to a turnstile that permits entry, or an automatic gate that unlocks or opens. Proximity detection device 160 may detect a potential customer with wireless communication device 110 near a store front and transmit a promotional coupon or advertisement to wireless communication device 110 to entice the potential customer to visit the store. Likewise, wireless communication device 120 of a first user may recognize when wireless communication device 110 of a second user is in proximity and send an invitation to wireless communication device 110 to invite the second user to meet (e.g., helps friends and family members find each other). In another example (not shown), settings of a household device may be adjusted to preferences associated with or stored on wireless communication device 110 as wireless communication device 110 comes into proximity. In another example, a leash tag (not shown) may be a removable device attached to a pet collar or clothing of a wandering toddler where secure communications between the leash tag and wireless communication device 110 result in an alarm notification on wireless communication device 110 when the leash tag exceeds a configurable distance threshold from wireless communication device 110.

The above wireless communication devices can be portable or mobile and can determine relative positions and/or distances with each other. Some wireless devices may be stationary (e.g., proximity detection device 160) and may determine absolute positions or geographic locations.

System 100 may also include wireless communication device 165 that utilizes legacy 802.11 technologies that may not support waveform structures for secure channel estimation. When wireless communication device 165 receives the ranging packet that includes the waveform structures, wireless communication device 165 can determine the duration of the ranging packet (e.g., a length of the ranging packet) and defer access to that channel for at least the duration. The duration of the ranging packet may be determined from one or more fields of the preamble of the ranging packet structure.

Figure 2:
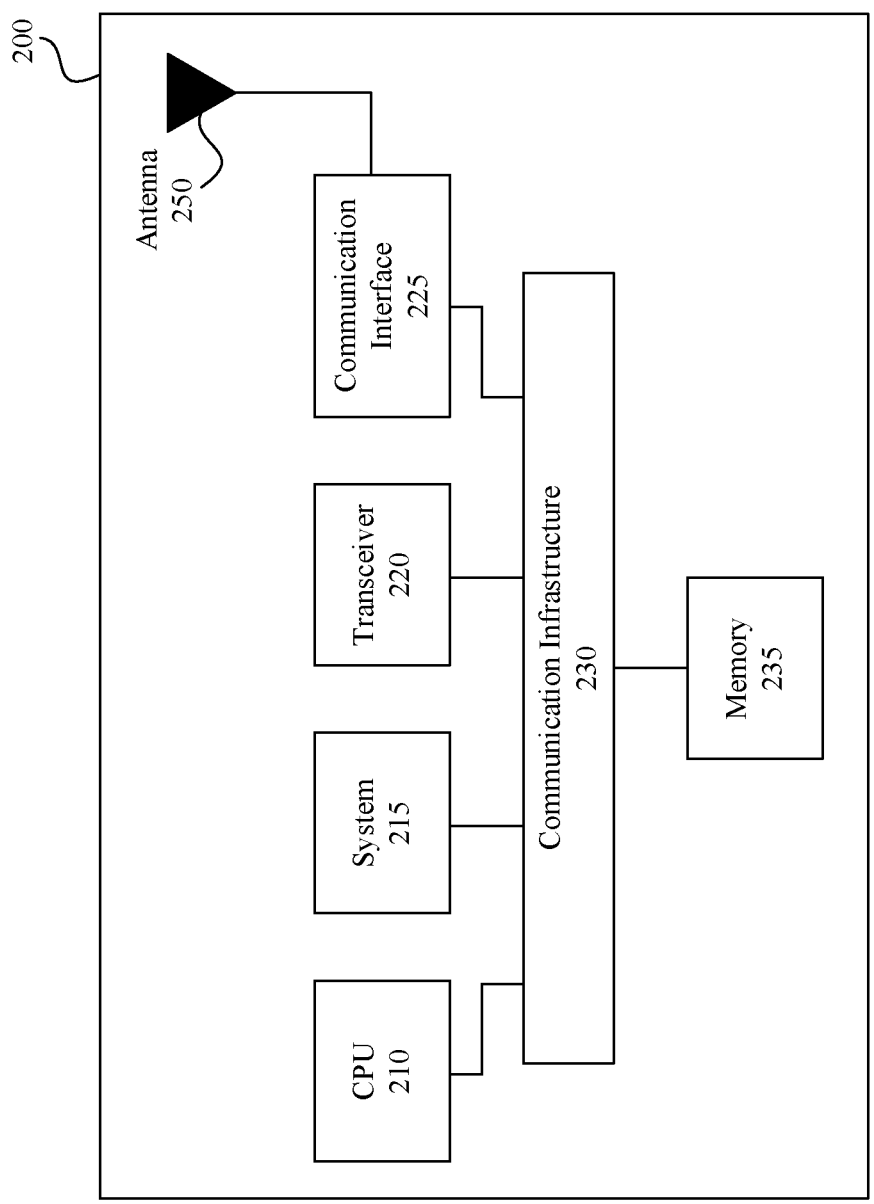
FIG. 2 illustrates a block diagram of an example wireless ranging system with secure channel estimation, according to some embodiments of the disclosure.

FIG. 2 is a block diagram that illustrates an example wireless ranging system 200 with secure channel estimation, according to some embodiments of the disclosure. System 200 may be any of the devices (e.g., 110, 120, 130, 140, 150, and/or 160) of system 100. System 200 may include central processing unit (CPU) 210, system 215, transceiver 220, communication interface 225, communication infrastructure 230, memory 235, and antenna 250. System 215 may be a system on a chip and may include one or more processors, memory including cache, and instructions that together perform operations enabling wireless communications including secure channel estimation. Transceiver 220 transmits and receives communications signals including ranging packet structures that include waveforms for secure channel estimation according to some embodiments, and may be coupled to antenna 250. Communication interface 225 allows system 200 to communicate with other devices that may be wired and/or wireless. Communication infrastructure 230 may be a bus. Memory 235 may include random access memory (RAM) and/or cache, and may include control logic (e.g., computer software) and/or data. Antenna 250 may include one or more antennas that may be the same or different types.

Figure 9:
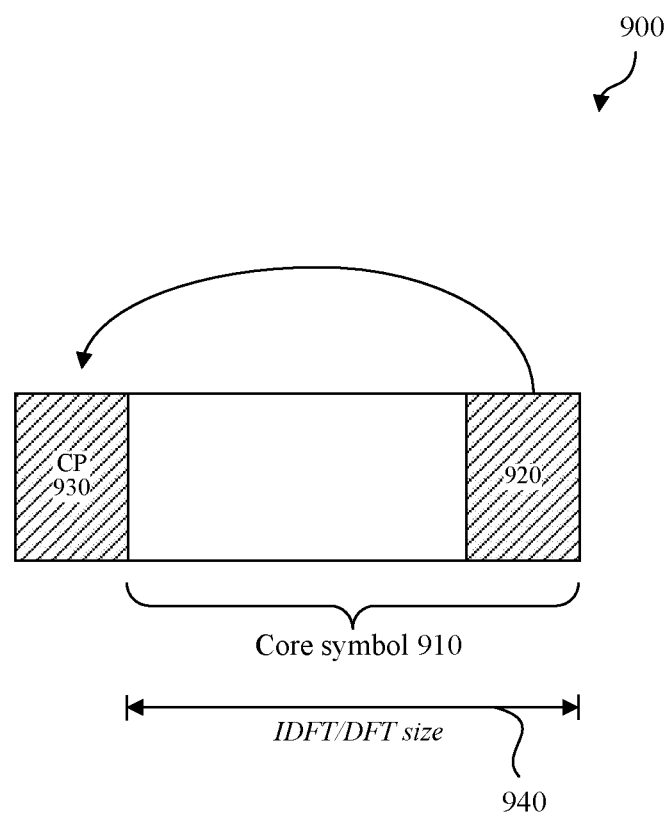
FIG. 9 illustrates an example symbol of a repetitive structure waveform.
Figure 10:
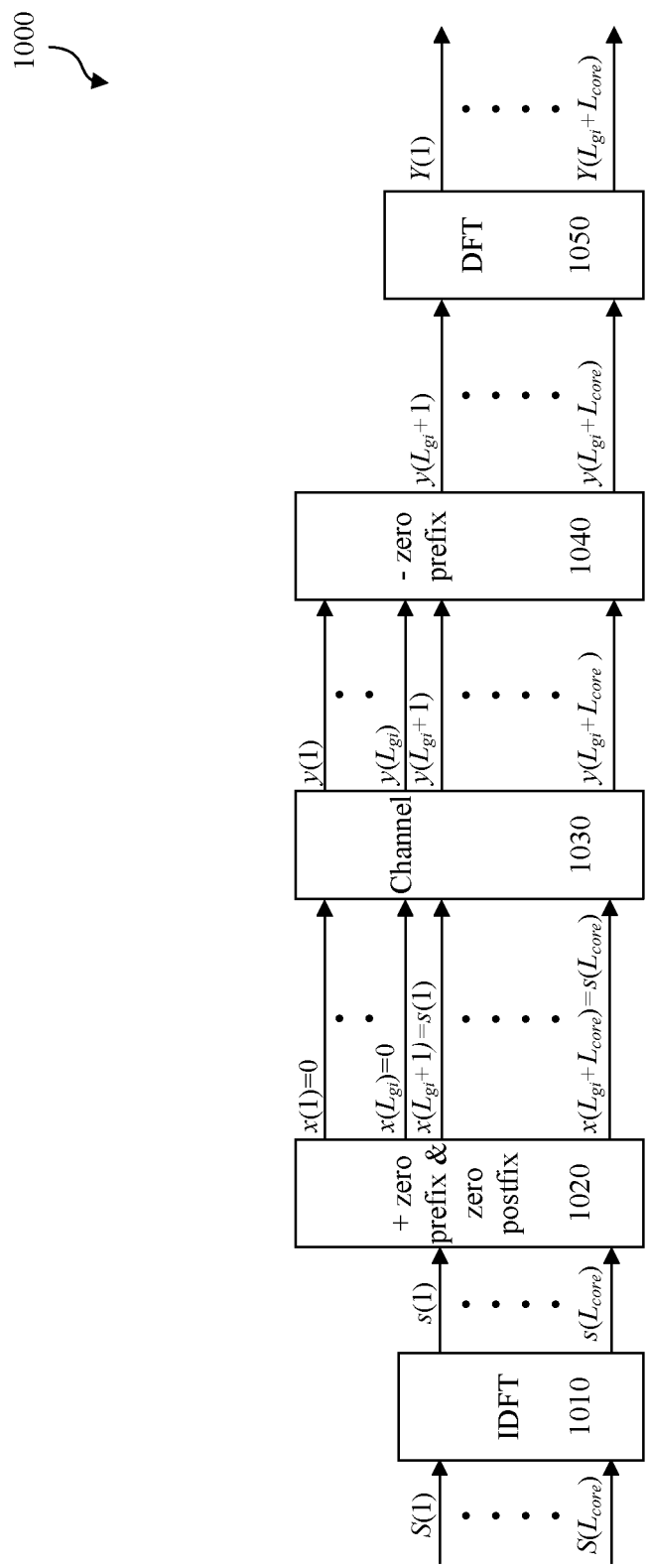
FIG. 10 illustrates an example transmission and reception scheme of a Cyclic Prefix (CP) OFDM waveform.

FIGS. 9 and 10 are example illustrations to demonstrate how wireless communication systems utilizing a known and/or repetitive symbol structure are vulnerable to a hacker device. FIG. 9 illustrates an example symbol 900 of a repetitive structure waveform. In this example, symbol 900 is a Cyclic Prefix (CP) OFDM waveform. Symbol 900 includes a core symbol 910, an end 920 (e.g., the last 25% of core symbol 910), and a CP 930. The size of an Inverse Discrete Fourier Transform (IDFT)/Discrete Fourier Transform (DFT) pair that transmits and receives symbol 900 is equal to the length of core symbol 910. Symbol 900 is a known structure and a hacker device can readily listen in and begin recording portions of symbol 900. Once the repeated end 920 is detected, the hacker device can send an interloper transmission of symbol 900 with a timing advance. When the interloper transmission of symbol 900 is received before any authentic wireless transmission, the receiver may interpret the interloper transmission as a first arrival path and calculate an incorrect range with respect to the system with which the receiver is communicating (e.g., not the hacker device). Thus, a hacker device can tamper with timing measurements/reports, resulting in incorrect channel estimation and incorrect range calculation. This incorrect channel estimation can cause security issues. For example, due to the interloper transmission, vehicle transponder device 130 of FIG. 1 may unlock or open doors when wireless communications device 110 is farther away from the vehicle than intended (e.g., 50 m).

FIG. 10 illustrates an example transmission and reception scheme 1000 of a CP OFDM waveform such as symbol 900. As a convenience and not a limitation, FIG. 10 will be described with reference to the elements of FIG. 9. Scheme 1000 includes an IDFT 1010, an adding zero prefix 1020, a channel 1030, a subtracting zero prefix 1040, and a DFT 1050. The size of IDFT 1010 and DFT 1050 are both equal to the length of core symbol 910 as noted by IDFT/DFT size 940. In this example, the CP includes zeros. Since CP 930 is known to be equal to end 920, and end 920 is known to be 25% of core symbol 910, a hacker device can recognize core symbol 910 and transmit an interloper transmission.

To protect against an interloper transmission that can tamper with ranging/timing measurements and/or reports, embodiments include securely exchanging information between wireless systems before a ranging process begins. The information exchanged are known to the wireless systems involved in the ranging process but not known to other entities. When the devices are in proximity and the ranging process begins, the wireless systems exchange waveforms that do not include a repetitive and/or predictable structure (e.g., CP-OFDM and Golay sequences). In some embodiments, a symbol of the waveform may include of three parts: a zero prefix, a core symbol, and a zero postfix. The zero prefix is inserted in front of a symbol to remove inter-symbol interference from a previous symbol. A length of a zero prefix (denoted as "$L_{gi}$") indicates a number of zero signal samples, and may be equivalent to a guard interval (GI). The zero prefix is greater than or equal to the maximum channel delay of a wireless system that transmits and/or receives waveforms for secure channel estimation. A zero postfix is a zero signal appended at the end of a core symbol. While not a static length for each symbol like a CP, the length of a zero postfix (denoted as "$L_{gi}$") can be the same as that of a corresponding zero prefix ($L_{gi}$). With such a structure, linear convolution of the transmitted waveform and channel can be converted to cyclic convolution. Thus, in some embodiments, transform-domain channel estimation with efficient implementation can be applied without distortion, and can be implemented by a DFT/IDFT pair in a corresponding receiver/transmitter pair, for example.

The number of samples of a core symbol is denoted as its length, $L_{core}$. In some embodiments, the information exchanged between wireless systems may include one or more core symbols, where each core symbol exchanged between two wireless systems is different. A core symbol may include a sequence of samples, s(n). Core symbols may be different from each other based on a different sequence of samples, a different modulation scheme, and/or a different length $L_{core}$ (or $L_{gi}$, according to Eq. 1 below).

In contrast to CP OFDM described above, where the CP is identical to the last 25% (or other percentage) of a core symbol that is repeated, a hacker device cannot determine the core symbol based on a zero prefix. Further, a core symbol is different for each symbol. Since there are no repeating portions, a listening hacker device has no basis for determining the waveform of a core symbol.

In some embodiments, the sum of the length of a core symbol ($L_{core}$) and a zero postfix ($L_{gi}$) is a power of 2, where a size of a DFT/IDFT may be equal to the power of 2, such that:

$$(L_{gi} + L_{core}) = 2^n, \text{ where } n \text{ is an integer greater than zero.} \quad \text{(Eq. 1)}$$

Examples of sum lengths ($L_{gi} + L_{core}$) using the numerology in WiFi (11a/g/n/ac) in 2.4/5 GHz that enables for example, reuse of existing receiver modules are shown in Table 1:

TABLE 1

|  | 20 MHz | 40 MHz | 80 MHz | 160 MHz |
| --- | --- | --- | --- | --- |
| DFT/IDFT size | 64 | 128 | 256 | 512 |
| Length of zero prefix/postfix: $L_{gi}$ | 16 | 32 | 64 | 128 |
| Length of core symbol: $L_{core}$ | 48 | 96 | 192 | 384 |

For example, for a 20 MHz bandwidth, a 64 sample size DFT/IDFT may have $L_{gi}$ equal to 16 samples, and according to Eq. 1 above, $L_{core}$ is equal to 48 samples. In this example, $L_{gi}$ can be any number less than 64. Other combinations of $L_{gi}$ and $L_{core}$ are possible such as $L_{gi}=17$ and $L_{core}=47$, $L_{gi}=48$ and $L_{core}=12$, and so on. Similar combinations may be determined according to Eq. 1 for the remaining bandwidths.

In some embodiments, the length of a core symbol ($L_{core}$) can be the same as in legacy 802.11 systems (11a/g/n/ac) to reuse the legacy numerology at the transmitter side. The DFT size at the receiver side can be chosen as ($L_{gi} + L_{core}$) or larger by adding more zeros for efficient implementation (e.g., a power of 2).

Examples of $L_{core}$ using the numerology in WiFi (11a/g/n/ac) in 2.4/5 GHz that enables for example, reuse of existing transmitter modules are shown in Table 2:

TABLE 2

|  | 20 MHz | 40 MHz | 80 MHz | 160 MHz |
| --- | --- | --- | --- | --- |
| DFT/IDFT size | 64/128 | 128/256 | 256/512 | 512/1024 |
| Length of zero prefix/postfix: $L_{gi}$ | 16 | 32 | 64 | 128 |
| Length of core symbol: $L_{core}$ | 64 | 128 | 256 | 512 |

Figure 3:
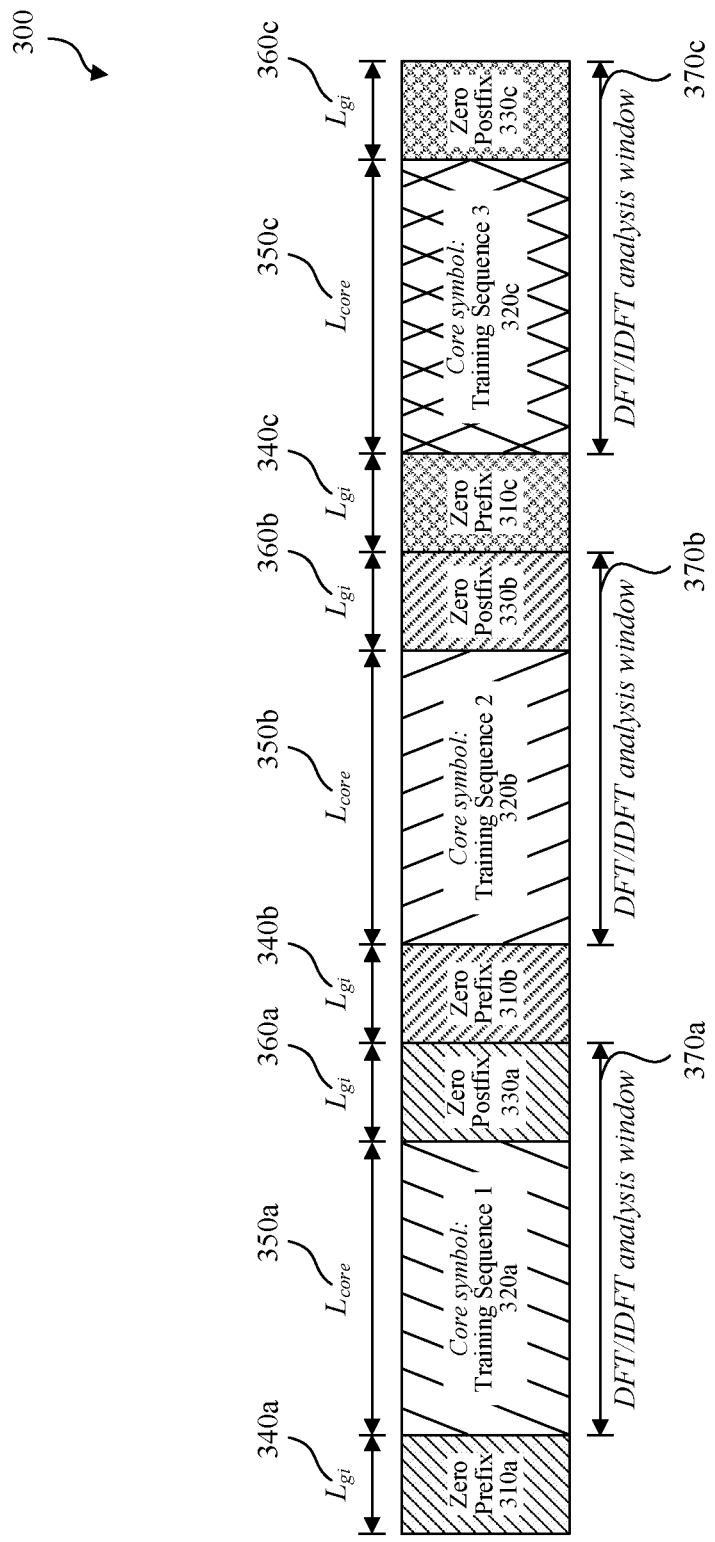
FIG. 3 illustrates an example communication of multiple consecutive symbols of a wireless ranging system with secure channel estimation, according to some embodiments of the disclosure.

When multiple consecutive symbols are used for channel estimation, some embodiments include options for inserting the zero prefix and zero postfix. These are described with regard to FIGS. 3 and 4. FIG. 3 illustrates an example communication 300 of multiple consecutive symbols of a wireless ranging system with secure channel estimation, according to some embodiments of the disclosure. In communication 300, each symbol a-c includes a zero prefix 310, a core symbol 320, and a zero postfix 330. As described above, $L_{gi}$ 340a is the same as $L_{gi}$ 360a, since the zero prefix 310a is the same length of the zero postfix 330a. As noted above, each core symbol 320a-c is different. Therefore, $L_{gi}$ 310a may be different than $L_{gi}$, 310b and/or $L_g$, 310c to accommodate the changes in core symbols 320a-c. As shown in FIG. 3, a DFT/IDFT analysis window 370 indicates the size of a DFT/IDFT at a receiver/transmitter.

Figure 4:
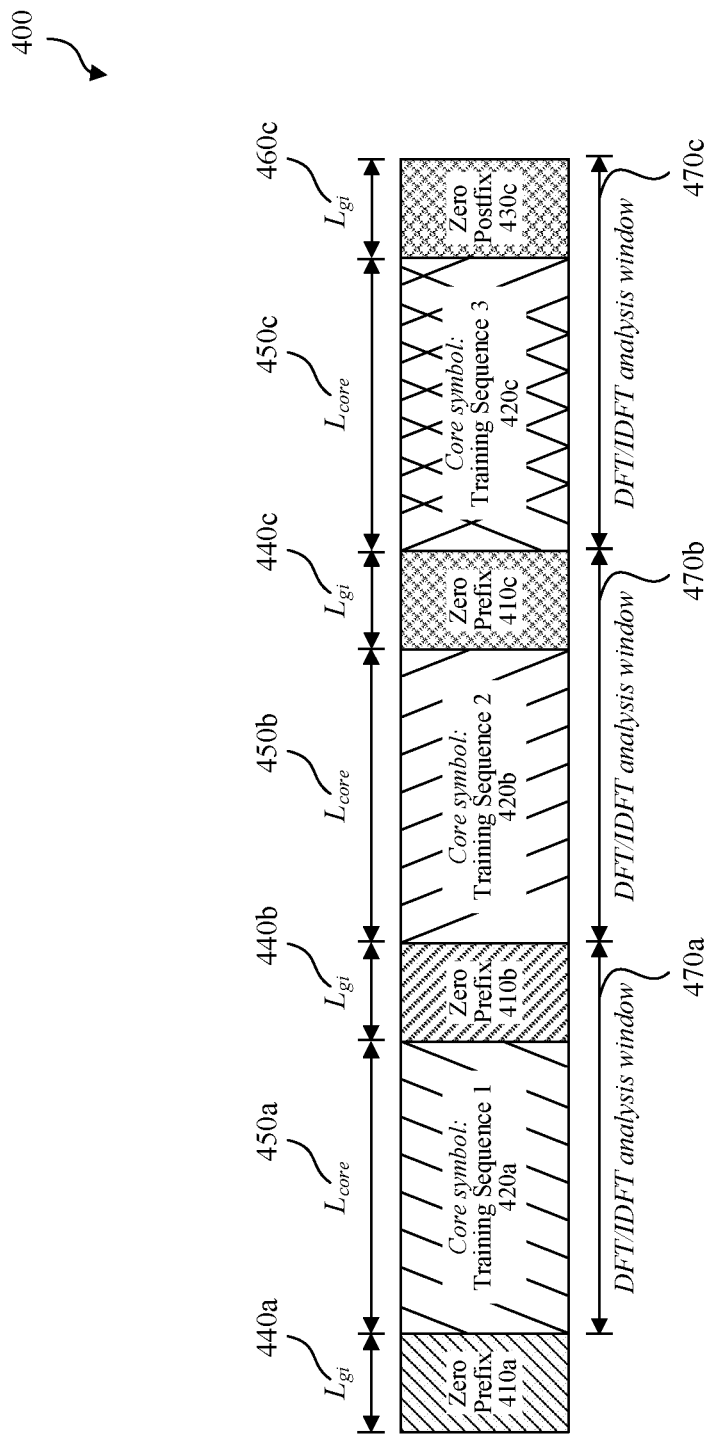
FIG. 4 illustrates another example communication of multiple consecutive symbols of a wireless ranging system with secure channel estimation, according to some embodiments of the disclosure.

FIG. 4 illustrates another example communication 400 of multiple consecutive symbols of a wireless ranging system with secure channel estimation, according to some embodiments of the disclosure. In communication 400, the zero postfix is omitted in symbols a and b. In some embodiments, each symbol a-c includes a zero prefix 410 and a core symbol 420, but only the last symbol, c, has a zero postfix 430c. As described above, $L_{gi}$ 440c is the same as $L_{gi}$ 460c, since the zero prefix 410c is the same length of the zero postfix 430c. Each symbol a-c has a different core symbol that may vary based on $L_{gi}$, the sequence s(n) in a core symbol, and/or a modulation scheme. As shown in FIG. 4, a DFT/IDFT analysis window 470 indicates the size of a DFT/IDFT at a receiver/transmitter.

The overhead of communication 300 with the additional zero prefixes 330a and 330b results in a higher overhead (e.g., larger time resources) than communication 400 as shown below:

Communication 300 overhead:

$$\frac{2L_{gi}}{2L_{gi} + L_{core}}.$$

Communication 400 overhead:

$$\frac{(N+1)L_{gi}}{(N+1)L_{gi} + NL_{core}},$$

where the number of symbols is denoted as N. Communication 300, however, has more tolerance to symbol timing errors due to the additional zero postfixes, as compared to communication 400.

The digital signals of a core symbol can be represented as s(n), where s(n), n=1, . . . , $L_{core}$.

The digital signals of the core symbol and a zero postfix can be represented as s'(n), where $$s'(n) = \begin{cases} s(n), n = 1, \ldots, L_{core} \\ 0, n = (L_{core} + 1), \ldots, N_{dft} \end{cases}$$

where $N_{dft}$ denotes the size of DFT.

Figure 5:
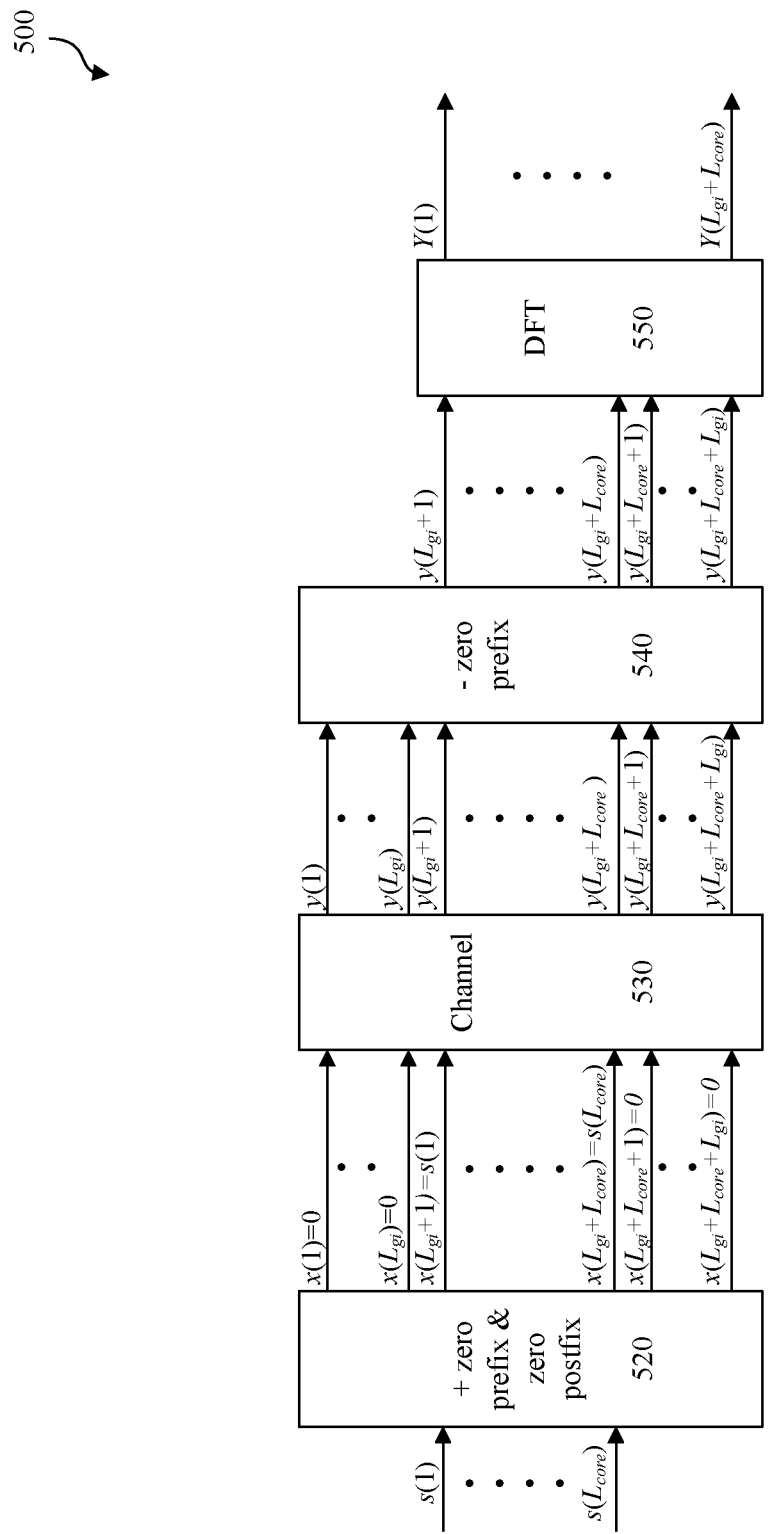
FIG. 5 illustrates an example transmission and reception scheme of a Single Carrier Physical Layer (SC-PHY) waveform for secure channel estimation, according to some embodiments of the disclosure.
Figure 6:
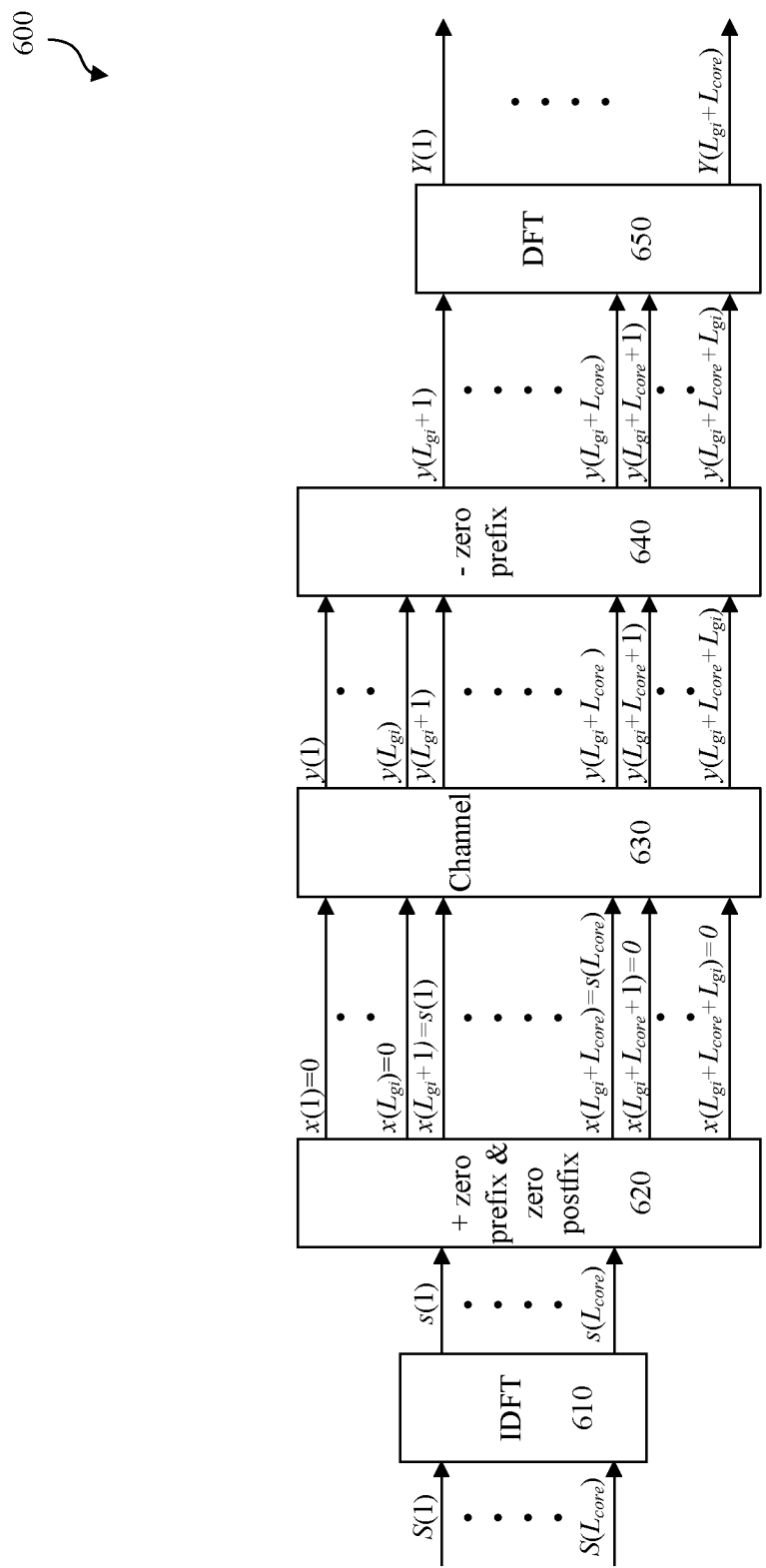
FIG. 6 illustrates an example transmission and reception scheme of an interpolated Orthogonal Frequency-Division Multiplexing (OFDM) waveform for secure channel estimation, according to some embodiments of the disclosure.

To transmit a symbol, a training sequence may be loaded onto a core symbol at a transmitter in the time domain or in the frequency domain as described in FIGS. 5 and 6, respectively. FIG. 5 illustrates an example transmission and reception scheme 500 of a Single Carrier Physical Layer (SC-PHY) waveform for secure channel estimation, according to some embodiments of the disclosure. Scheme 500 may utilize communication 300 or communication 400 for transmitting multiple consecutive symbols of a wireless ranging system with secure channel estimation. Communication 300 or communication 400 may be transmitted within a ranging packet that is generated and transmitted over channel 530.

To load a training sequence onto a core symbol in the time domain, samples of the digital signal, s(n), n=1, . . . , $L_{core}$ are taken as the constellation points of the chosen modulation format (e.g., binary phase shift keying (BPSK), a shifted quadrature phase shift keying (QPSK), π/2-BPSK, π/4- QPSK, 16QAM, etc.) As described above, each s(n) along with information including but not limited to $L_{core}$, $L_{gi}$, and/or a modulation scheme may be securely exchanged between the wireless systems (e.g., an initiating station and a responder station) before the ranging process begins. Thus, each receiver may detect and determine s(n) based on the information previously exchanged. In scheme 500, a transmitter adds a zero prefix and a zero postfix via "+ zero prefix and a zero postfix" 520 to the digital signal s(n), where the symbol is transmitted over channel 530 to a receiver. At the receiver, the zero prefix is removed via "− zero prefix" 540 and the signal undergoes analysis by DFT 550 to determine a frequency response of the received signal, Y(k). The size of a DFT 550 is ($L_{core}+L_{gi}$) or larger by adding more zeros for efficient implementation (e.g., a power of 2).

FIG. 6 illustrates an example transmission and reception scheme 600 of an interpolated Orthogonal Frequency-Division Multiplexing (OFDM) waveform for secure channel estimation, according to some embodiments of the disclosure. Scheme 600 may utilize communication 300 or communication 400 for transmitting multiple consecutive symbols of a wireless ranging system with secure channel estimation. Communication 300 or communication 400 may be transmitted within a ranging packet that is generated and transmitted over channel 630.

To load a training sequence onto a core symbol in the frequency domain, samples of the digital signal, s(n), n=1, . . . , $L_{core}$ in the frequency domain are noted as S(k), k=1, . . . , $L_{core}$, where s(n)=IDFT(S(k)) via an IDFT 610 of size of $L_{core}$. The time domain symbol passes to "+ zero prefix and zero postfix" 620 to add the respective zero prefix and postfix, and the signal traverses channel 630. At the receiver, the zero prefix is removed at "− zero prefix" 640, and the signal undergoes analysis by DFT 650 to determine a frequency response of the received signal, Y(k). The size of a DFT 650 is ($L_{core}+L_{gi}$) or larger by adding more zeros for efficient implementation (e.g., a power of 2). As described above, each s(n) along with information including but not limited to $L_{core}$, $L_{gi}$, and/or a modulation scheme may be securely exchanged between the wireless systems (e.g., an initiating station and a responder station) before the ranging process begins. Thus, each receiver may determine S'(k) based on the information previously exchanged, where S'(k) denotes the frequency response of s'(n). In some embodiments, a constant modulus constellation may be implemented. To alleviate noise enhancements, some embodiments employ a shifted BPSK or a shifted QPSK (e.g., π/2-BPSK, π/4-QPSK) modulation scheme. Since the transition in between adjacent shifted BPSK or shifted QPSK symbols does not cross zero, the frequency response of s'(n) has smaller dips meaning that the magnitude of the frequency response is far above zero so that noise will not be amplified if a division operation is performed when using it as a denominator.

For scheme 500 and scheme 600, the channel in the frequency domain can be derived by:

$$\hat{H}(k) = \frac{Y(k)}{S'(k)}, k = 1, \ldots, N_{dft}$$

where S'(k) denotes the frequency response of s'(n), and $N_{dft}$ denotes the size of DFT. S'(k) is an interpolated version of S(k).

Figure 7A:
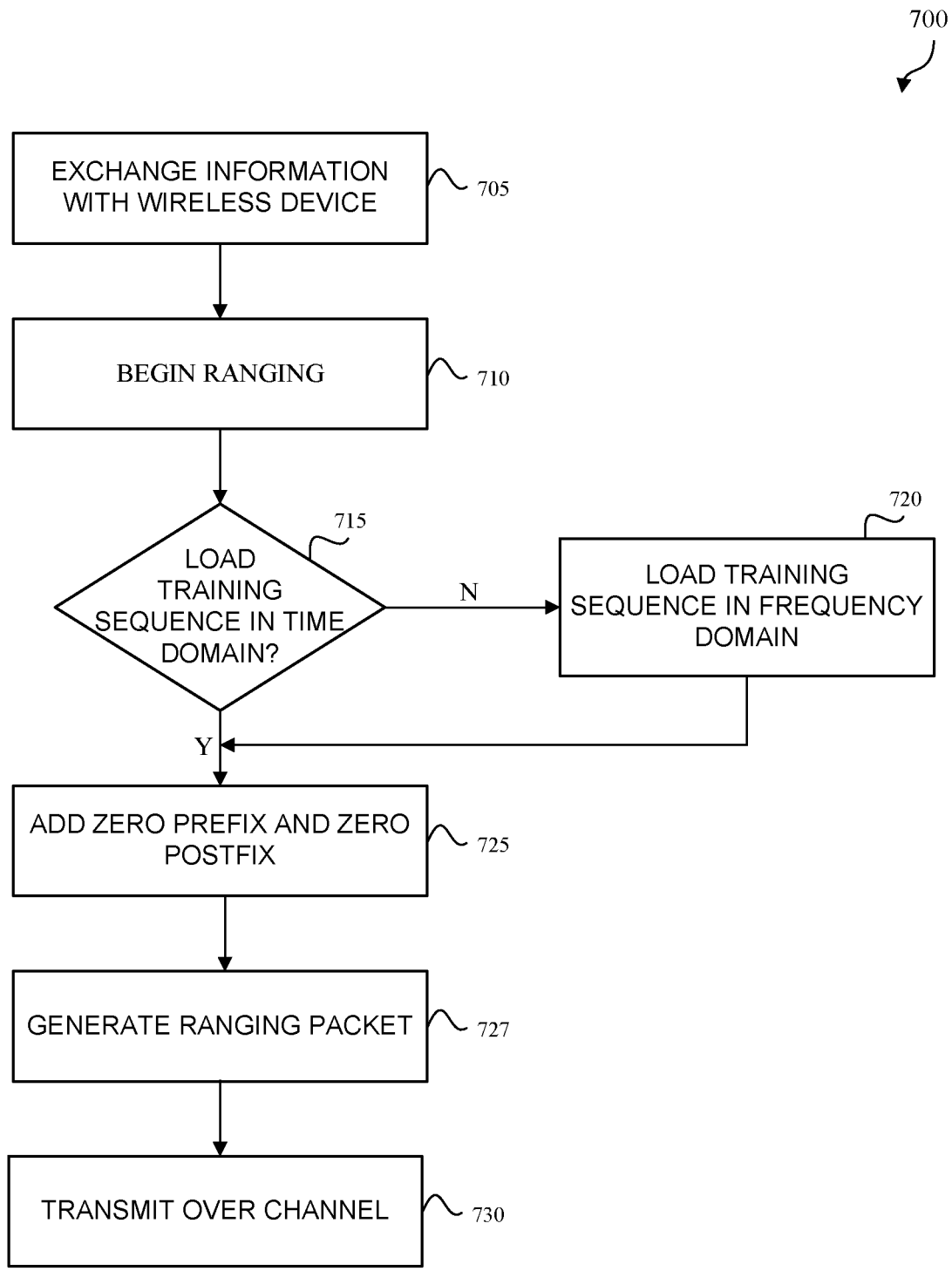
FIG. 7A illustrates an example method performed by a transmitter of a wireless ranging system with secure channel estimation, according to some embodiments of the disclosure.
Figure 7B:
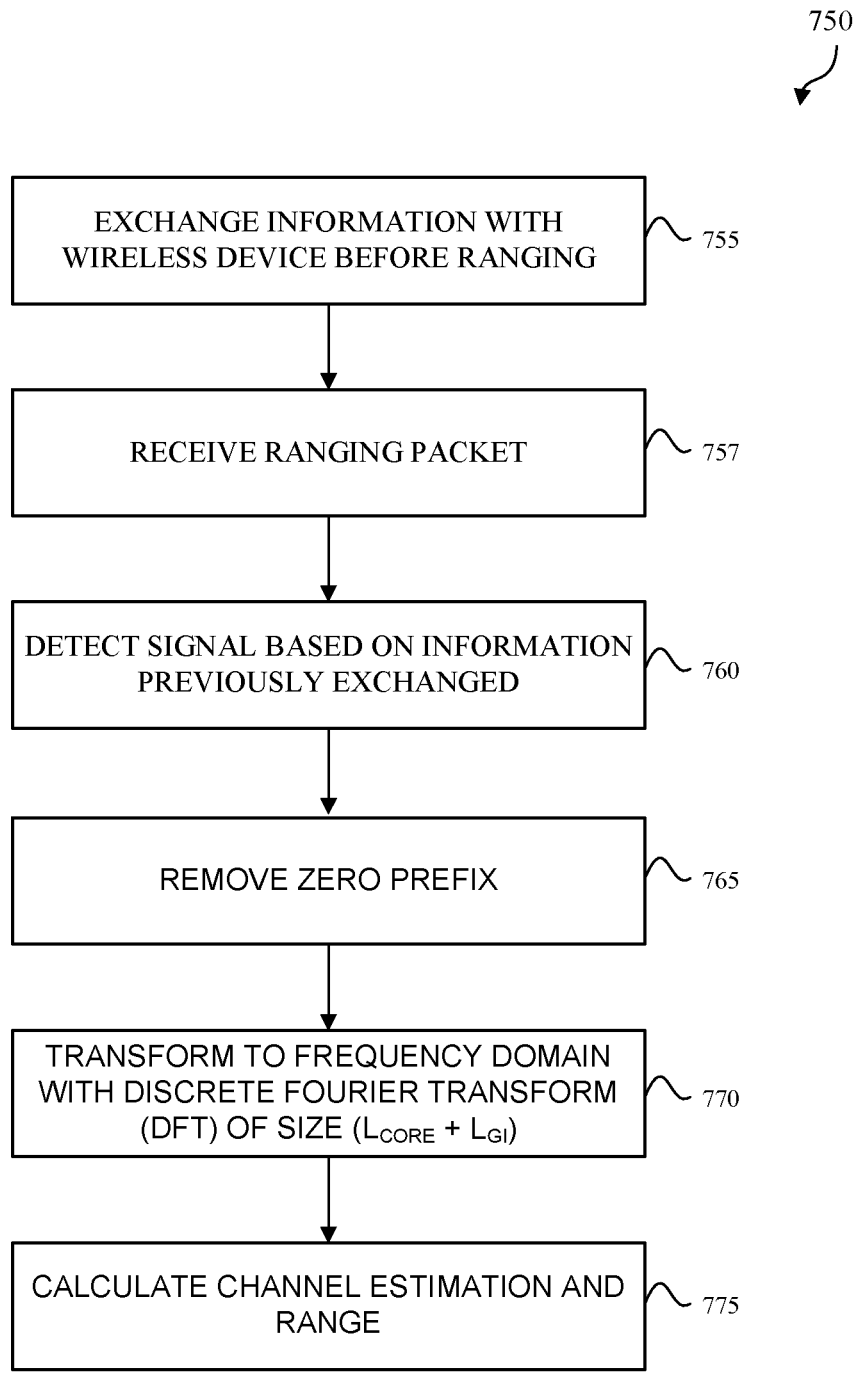
FIG. 7B illustrates an example method performed by a receiver of a wireless ranging system with secure channel estimation, according to some embodiments of the disclosure.

FIG. 7A illustrates a method 700 performed by a transmitter of a wireless ranging system with secure channel estimation, according to some embodiments of the disclosure. FIG. 7B illustrates a method 750 performed by a receiver of a wireless ranging system with secure channel estimation, according to some embodiments of the disclosure. As a convenience and not a limitation, FIGS. 7A and 7B may be described with regard to elements of FIGS. 1-6. Method 700 may be performed by transceiver 220 of FIG. 2.

Method 700 begins at 705 where information is exchanged between wireless devices that use waveforms to enable secure channel estimation such as, for example, between wireless communications device 110 and devices 120, 130, 140, 150, and 160 of FIG. 1. In some embodiments, the information may be exchanged inband (e.g., in a preamble or in an encrypted message before a ranging process begins), out-of-band via wireless interface (Wi-Fi, cellular, Bluetooth®, Zigbee, etc.) or via a wired interface (e.g., USB interface of vehicular transponder device 130.) During this information exchange or prior to this information exchange wireless communications device 110 and devices 120, 130, 140, 150, and 160 of FIG. 1 may exchange capabilities such as the technologies that each device supports (e.g., IEEE 802.11a/g/n/ac/ax/ad/ay/az).

The information exchanged are known to the wireless systems involved in the ranging process but not known to other entities. For example, wireless communications device 110 exchanges information with vehicular transponder device 130 to allow the exchange of waveforms that enable secure channel estimation (e.g., prevent a hacker device from transmitting interloper transmissions). Secure channel estimation allows accurate determination of the distance between, wireless communications device 110 and vehicular transponder device 130 so that the vehicle unlocks or opens doors when the user of wireless communications device is nearby (e.g., 3 m away). Inaccurate distance calculations could lead to the vehicle unlocking, opening doors, and/or starting engines, when wireless communications device 110 is far away (e.g., 50 m away). The information exchanged may include core symbols that are different from each other, a modulation scheme associated with each core symbol, and/or a $L_{core}$ (or $L_{gi}$ according to Eq. 1) for each core symbol, according to some embodiments of the disclosure.

At 710, the ranging process begins. For example, wireless communications device 110 may be in proximity of vehicle transponder device 130 and based on a received signal strength indication, wireless communications device 110 begins to transmit one or more symbols according to communication 300 or communication 400.

At 715, method 700 determines which waveform to choose such as, for example, SC-PHY or interpolated OFDM. Method 700 determines whether to load a training sequence onto a corresponding core symbol in the time domain (e.g., scheme 500 of FIG. 5) or in the frequency domain (e.g., scheme 600 of FIG. 6). When loading the training sequence in the time domain, method 700 proceeds to 725. When loading in the frequency domain, method 700 proceeds to 720.

At 720, the training sequence (e.g., S(1), . . . S($L_{core}$)), is loaded in the frequency domain. For example, the training sequence in the frequency domain is transformed to the time domain with an IDFT of size $L_{core}$. For example, IDFT 610 of FIG. 6 may receive the core symbol in the frequency domain and transform the core symbol to the time domain.

At 725, the zero prefix and zero postfix are added to the core symbol. For example, as shown in FIG. 6, the time domain core symbol passes to "+ zero prefix and zero postfix" 620 to add the respective zero prefix and postfix. The respective zero prefix may be the zero prefix 310c or 410c, the respective zero postfix may be the zero postfix 330c or 430c, respectively, and the core symbol may be core symbol 320c or 420c of FIG. 3 or 4, respectively.

At 727, the one or more symbols are included in a ranging packet where the structure of the ranging packet is compatible with legacy 802.11 systems.

At 730, the ranging packet comprising the one or more symbols is transmitted over a wireless channel to a receiving wireless system (e.g., vehicular transponder device 130). The wireless channel may use a wireless interface that supports the SC-PHY waveform or the interpolated OFDM waveform. For example, the one or more symbols in the ranging packet transmitted may be communication 300 or communication 400 of FIG. 3 or 4, respectively. The transmitter for the SC-PHY waveform may be the transmitter shown in FIG. 5. The transmitter for the interpolated OFDM waveform may be the transmitter shown in FIG. 6. Method 700 ends.

As mentioned above, FIG. 7B illustrates a method 750 for a receiver of a wireless ranging system with secure channel estimation, according to some embodiments of the disclosure. Method 750 may be performed by transceiver 220 of FIG. 2.

At 755, which may be substantially similar to 705 in method 700, information is exchanged between wireless systems (e.g., wireless communication device 110 and vehicle transponder device 130) as described above before a ranging process begins.

At 757, based on the information exchanged, transceiver 220 may receive the ranging packet that includes the one or more symbols and/or core symbols from wireless communication device 110. Again, the ranging packet structure is compatible with devices that implement legacy 802.11 technologies (e.g., wireless communications device 165.)

At 760, a receiver of vehicle transponder device 130 detects a wireless signal based on the information previously exchanged. For example, vehicle transponder device 130 may receive a received signal strength indication (RSSI) that satisfies a threshold value and may listen for a wireless signal from wireless communications device 110 with which it previously exchanged information in 755. For example, a receiver in vehicle transponder device 130 can recognize one or more symbols and/or core symbols in the ranging packet received from wireless communication device 110.

At 765, a receiver of vehicle transponder device 130 removes the zero prefix from the received wireless signal. For example, "– zero prefix" 540 of FIG. 5 or 640 of FIG. 6 may receive one or more symbols over the communication channel and then remove the zero prefixes such as, for example, the zero prefix 310c or 410c of FIG. 3 or 4, respectively.

At 770, a receiver of vehicle transponder device 130 transforms the received wireless signal to the frequency domain using a DFT of size ($L_{core}+L_{gi}$) or larger by adding more zeros for efficient implementation (e.g., a power of 2). For example, DFT 550 of FIG. 5 or 650 of FIG. 6 may receive a wireless signal that includes a symbol of length ($L_{core}+L_{gi}$) or larger by adding more zeros for efficient implementation (e.g., a power of 2) in the time domain and transform the symbol to the frequency domain to produce a frequency response, Y(k), of the received wireless transmission.

At 775, a receiver of vehicle transponder device 130 calculates a channel estimation and determines the range between vehicle transponder device 130 and wireless communication device 110. Because the channel estimation is secure (e.g., free from an interloper transmission that would cause the channel estimation and hence the range calculation to be inaccurate), some embodiments herein enable use cases that rely on secure range calculations. For example, when wireless communication device is 3 m or less from vehicle transponder device 130, the vehicle doors will unlock, the trunk may open, and/or the ignition may start. Method 750 ends.

In the event wireless communications device 165 also receives the ranging packet, wireless communications device 165 may analyze the ranging packet structure and determine the duration of the ranging packet even though wireless communications device 165 supports legacy 802.11 technologies (e.g., wireless communications device 165 does not support waveforms for secure channel estimation technology such as IEEE 802.11az.) Being able to determine the duration enables wireless communications device 165 to delay access to the channel and thus the ranging packet structure enables compatibility and coexistence among devices with technologies that support waveforms for secure channel estimation as well as devices that utilize prior technologies (e.g., legacy 802.11 technologies.)

Some embodiments of ranging packet structures that support secure channel estimation and are compatible with legacy technologies follow. For example, devices implementing legacy 802.11 technologies may receive the ranging packet structures and defer transmissions on that channel correctly to coexist with technologies that support secure channel estimation (e.g., IEEE 802.11az.) The ranging packet structures interoperate and coexist with legacy packets utilized in legacy 802.11 technologies. As an example, WiFi technologies at the 2.4 GHz and/or 5 GHz include IEEE 802.11a/g/n/ac/ax packets. IEEE 802.11az ranging packet structures that support secure channel estimation at 2.4 GHz and/or 5 GHz include for example, high throughput z (HTz), very high throughput z (VHTz), and high efficiency z (HEz) ranging packet structures.

WiFi technologies at 60 GHz include IEEE 802.11ad/ay packets. IEEE 802.11az ranging packet structures that support secure channel estimation at 60 GHz include for example Directional Multi Gigabit z (DMGz) packets and Enhanced Directional Multi Gigabit z (EDMGz) ranging packet structures.

Figure 18:
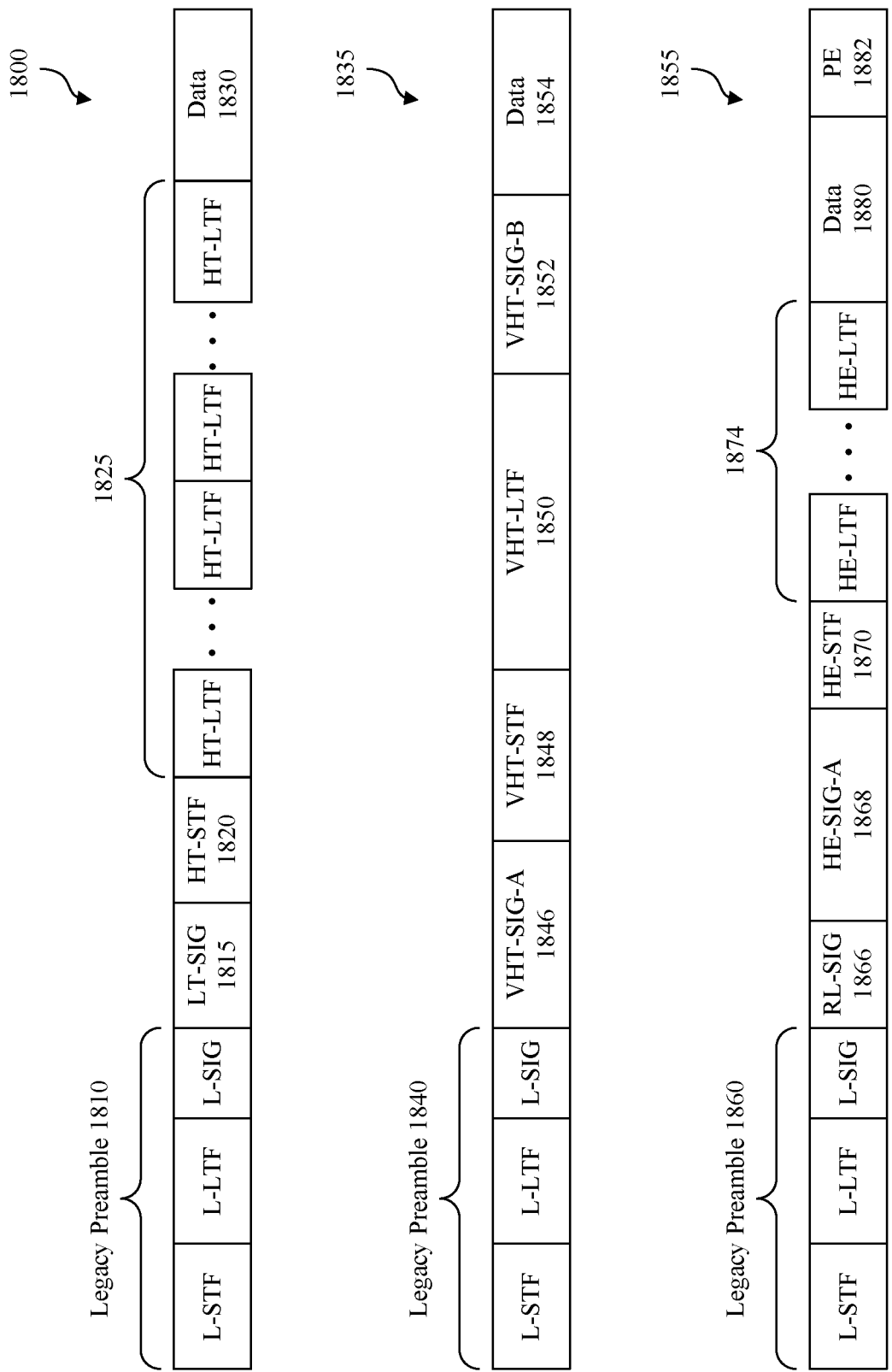
FIG. 18 illustrates example physical layer conformance procedure (PLCP) packet data units (PPDUs) for high throughput (HT), very high throughput (VHT), and high efficiency (HE) for a 20 MHz channel bandwidth signal.

FIG. 18 illustrates example physical layer conformance procedure (PLCP) packet data units (PPDUs) for high throughput (HT) 1800, very high throughput (VHT) 1835, and high efficiency (HE) 1855 for a 20 MHz bandwidth signal. Legacy preambles 1810, 1840, and 1860 each include a legacy short training field (L-STF), a legacy long training field (L-LTF), and a legacy signal field (L-SIG) consistent with legacy IEEE 802.11 a/g technologies. HT packet data unit 1800 includes HT signal (HT-SIG) 1815 that transfers rate and length information, HT short training field (HT-STF) 1820 to improve automatic gain control (AGC), and HT long training fields (HT-LTFs) 1825 for a receiver to demodulate HT data 1830 and support probe extensions. VHT PPDU 1835 also includes VHT Signal A (VHT-SIGA) 1846, VHT training short field (VHT-STF) 1848, VHT long training field (VHT-LTF) 1850, VHT Signal B (VHT-SIGB) 1852, and data 1854. Likewise, HE PPDU 1855 also includes repeated legacy signal field (RL-SIG) 1866, a HE signal field A (HE-SIGA) 1868, a HE short training field (HE-STF) 1870, a variable number of HE long training fields (HE-LTF) 1874, data 1880, and packet extension (PE) 1882.

Figure 19:
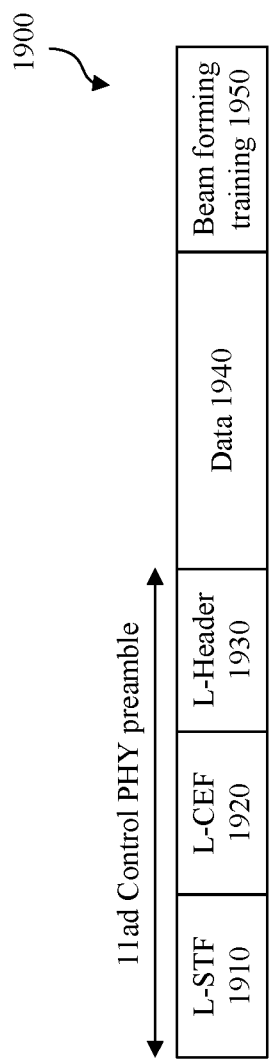
FIG. 19 illustrates example Directional Multi Gigabit (DMG) PLCP packet data unit (PPDU) for a 20 MHz channel bandwidth signal.

FIG. 19 illustrates example Directional Multi Gigabit (DMG) PLCP packet data unit (PPDU) 1900 for a 20 MHz channel bandwidth signal. The IEEE 802.11ad control physical layer (PHY) preamble includes legacy short training field (L-STF) 1910, legacy channel estimation field (L-CEF) 1920, legacy header (L-Header) 1930, data 1940, and beam forming training field 1950.

Figure 20:
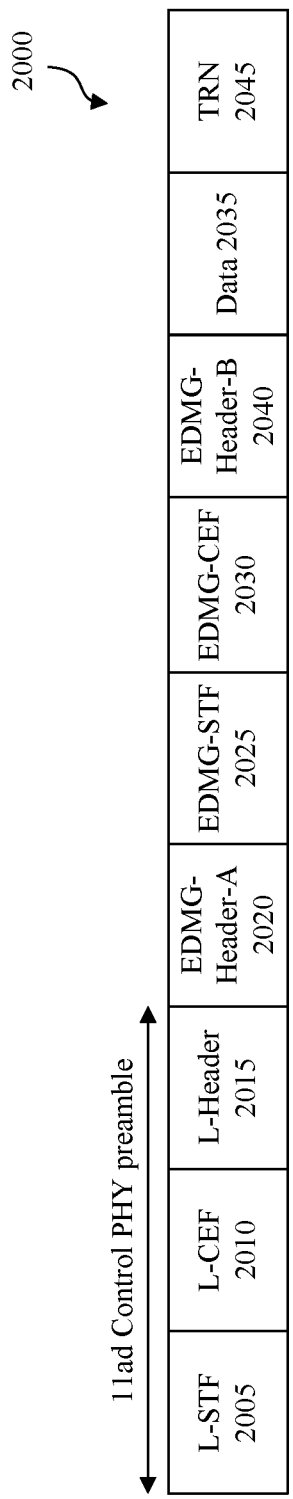
FIG. 20 illustrates example Enhanced Directional Multi Gigabit (EDMG) PLCP packet data unit (PPDU) for a 20 MHz channel bandwidth signal.

FIG. 20 illustrates example Enhanced Directional Multi Gigabit (EDMG) PLCP packet data unit (PPDU) 2000 for a 20 MHz channel bandwidth signal. The IEEE 802.11ay control physical layer (PHY) preamble includes legacy short training field (L-STF) 2005, legacy channel estimation field (L-CEF) 2010, legacy header (L-Header) 2015, EDMG Header A 2020, EDMG-STF 2025, EDMG channel estimation field (EDMG-CEF) 2030, and EDMG Header B 2040, data 2035, and training sequences field (TRN) 245.

Figure 11:
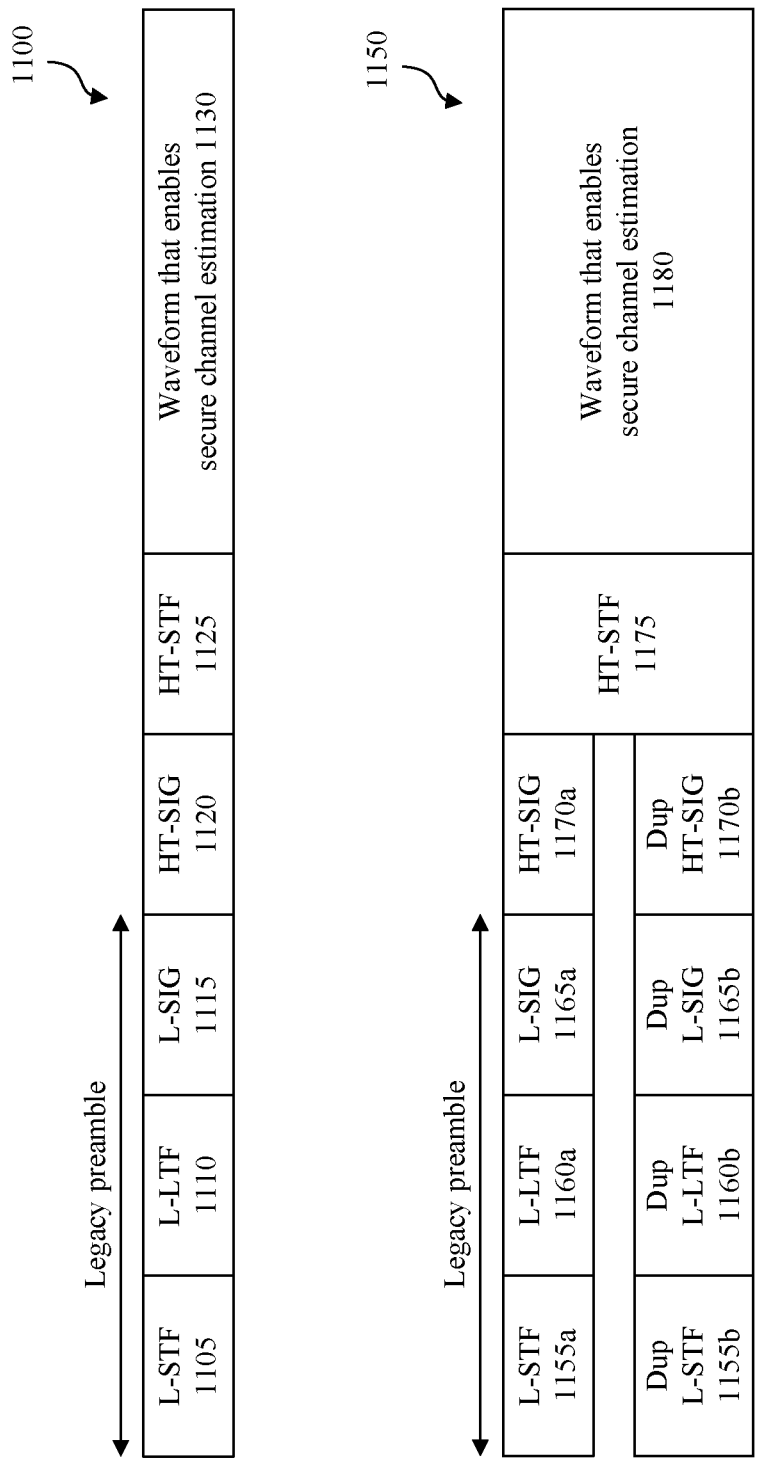
FIG. 11 illustrates example ranging packet structures for high throughput z (HTz) for 20 MHz and 40 MHz channel bandwidths, according to some embodiments of the disclosure.

FIG. 11 illustrates example ranging packet structure 1100 for high throughput z (HTz) for 20 MHz channel bandwidths and ranging packet structure 1150 for 40 MHz channel bandwidths, according to some embodiments of the disclosure. HTz ranging packet structures may be implemented at 2.4 GHz and/or 5 GHz frequencies. In some embodiments, ranging packet structure 1100 includes a waveform 1130 that enables secure channel estimation, and that replaces HT-LTF fields (e.g., HT-LTF fields 1825 of FIG. 18). Waveform 1130 may be communication 300 of FIG. 3 or communication 400 of FIG. 4. In ranging packet structure 1100, the legacy preamble includes L-STF 1105, L-LTF 1110, and L-SIG 1115 to accommodate devices that implement legacy 802.11 technologies such as IEEE 802.11a/g. Devices that implement legacy 802.11 technologies such as IEEE 802.11n/ac/ax may determine a duration of ranging packet structure 1100 by analyzing HT-SIG 1120 and/or L-SIG 1115. Once the duration of ranging packet structure 1100 is known, the devices implementing legacy 802.11 technologies may properly defer channel access. Thus, ranging packet structure 1100 for HTz includes waveform 1130 that enables secure channel estimation and that compatibly coexists with devices implementing legacy 802.11 technologies (e.g., wireless communication device 165.) Automatic gain control may be recalculated based at least on HT-STF 1125 that corresponds to the physical layer format of ranging packet structure 1100.

Likewise, in ranging packet structure 1150 with a 40 MHz channel bandwidth, waveform 1180 enables secure channel estimation and replaces HT-LTF fields (e.g., HT-LTF fields 1825 of FIG. 18). Waveform 1180 may be communication 300 of FIG. 3 or communication 400 of FIG. 4. The legacy preamble includes L-STF 1155a, L-LTF 1160a, and L-SIG 1165a to accommodate devices that implement legacy 802.11 technologies such as IEEE 802.11a/g. Devices that implement legacy 802.11 technologies such as IEEE 802.11n/ac/ax may determine a duration of ranging packet structure 1100 by analyzing HT-SIG 1170 and/or L-SIG 1165. Note that the legacy preamble and HT-SIG fields are duplicated over each 20 MHz channel as noted by Dup L-STF 1155b, Dup L-LTF 1160b, Dup L-SIG 1165b and Dup HT-SIG 1170b. Once the duration of ranging packet structure 1150 is known, the devices implementing legacy 802.11 technologies may defer channel access. Thus, ranging packet structure 1150 for HTz includes waveform 1180 that enables secure channel estimation and that compatibly coexists with devices implementing legacy 802.11 technologies (e.g., wireless communication device 165.) Automatic gain control may be recalculated based at least on HT-STF 1175 that corresponds to the physical layer format of ranging packet structure 1150.

Figure 12:
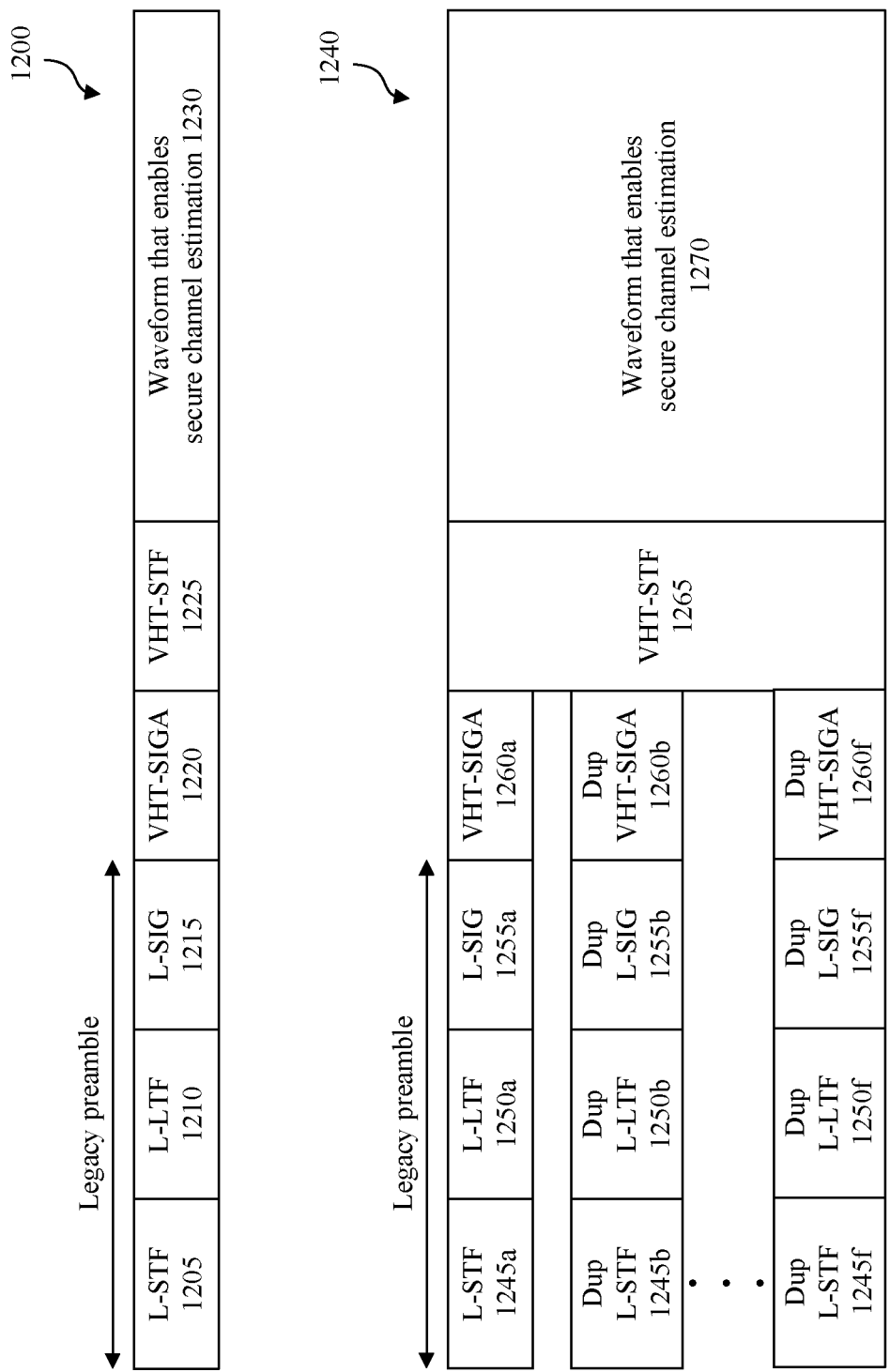
FIG. 12 illustrates example ranging packet structures for very high throughput z (VHTz) for 20 MHz and 40/80/160 MHz channel bandwidths, according to some embodiments of the disclosure.

FIG. 12 illustrates example ranging packet structure 1200 for very high throughput z (VHTz) for 20 MHz channel bandwidths and ranging packet structure 1240 for 40/80/160 MHz channel bandwidths, according to some embodiments of the disclosure. VHTz ranging packet structures may be implemented at 2.4 GHz and/or 5 GHz frequencies. In some embodiments, ranging packet structure 1200 includes a waveform 1230 that enables secure channel estimation 1230 and replaces VHT-LTF field (e.g., VHT-LTF 1850 of FIG. 18). Waveform 1230 may be communication 300 of FIG. 3 or communication 400 of FIG. 4. In ranging packet structure 1200, the legacy preamble includes L-STF 1205, L-LTF 1210, and L-SIG 1215 to accommodate devices that implement legacy 802.11 technologies such as IEEE 802.11a/g/n. Devices that implement legacy 802.11 technologies such as IEEE 802.11ac/ax may determine a duration of ranging packet structure 1200 by analyzing VHT-SIGA 1220 and/or L-SIG 1215. Multiuser format may not be used so VHT-SIGB may be omitted. Once the duration of ranging packet structure 1200 is known, the devices implementing legacy 802.11 technologies may defer channel access. Thus, ranging packet structure 1200 for VHTz includes waveform 1230 that enables secure channel estimation and that compatibly coexists with devices implementing legacy 802.11 technologies (e.g., wireless communication device 165.) Automatic gain control may be recalculated based at least on VHT-STF 1225 that corresponds to the physical layer format of ranging packet structure 1200.

Likewise, in ranging packet structure 1240 with a 40/80/160 MHz channel bandwidth, a waveform 1270 that enables secure channel estimation replaces the VHT-LTF field (e.g., VHT-LTF 1850 of FIG. 18). Waveform 1270 may be communication 300 of FIG. 3 or communication 400 of FIG. 4. The legacy preamble includes L-STF 1245a, L-LTF 1250a, and L-SIG 1255a to accommodate devices that implement legacy 802.11 technologies such as IEEE 802.11a/g/n. Devices that implement legacy 802.11 technologies such as IEEE 802.11ac/ax may determine a duration of ranging packet structure 1240 by analyzing VHT-SIGA 1260a and/or L-SIG 1255a. Multiuser format may not be used so VHT-SIGB may be omitted. Note that the legacy preamble and VHT-SIGA fields are duplicated over each 20 MHz channel as noted for example, by Dup L-STF 1245b, Dup L-LTF 1250b, Dup L-SIG 1255b and Dup VHT-SIGA 1260b, etc. Once the duration of ranging packet structure 1240 is known, the devices implementing legacy 802.11 technologies may defer channel access. Thus, ranging packet structure 1240 for VHTz includes waveform 1270 that enables secure channel estimation and that compatibly coexists with devices implementing legacy 802.11 technologies (e.g., wireless communication device 165.) Automatic gain control may be recalculated based at least on VHT-STF 1265 that corresponds to the physical layer format of ranging packet structure 1240.

Figure 13:
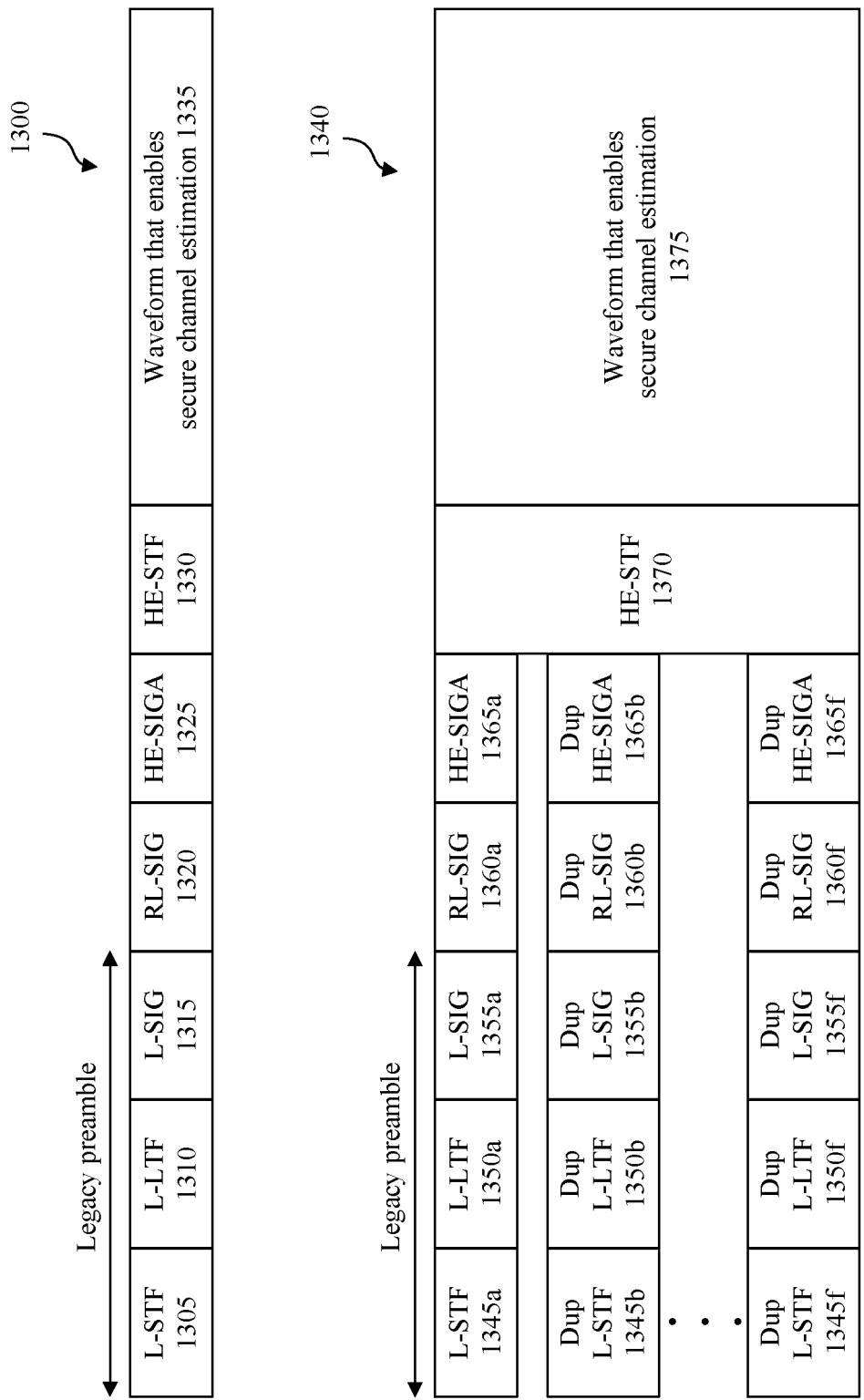
FIG. 13 illustrates example ranging packet structures for high efficiency z (HEz) for 20 MHz and 40/80/160 MHz channel bandwidths, according to some embodiments of the disclosure.

FIG. 13 illustrates example ranging packet structure 1300 for high efficiency z (HEz) for 20 MHz and ranging packet structure 1340 for 40/80/160 MHz channel bandwidths, according to some embodiments of the disclosure. HEz ranging packet structures may be implemented at 2.4 GHz and/or 5 GHz frequencies. In some embodiments ranging packet structure 1300 includes a waveform 1335 that enables secure channel estimation and that replaces HE-LTF fields (e.g., VHT-LTF fields 1874 of FIG. 18.) Waveform 1335 may be communication 300 of FIG. 3 or communication 400 of FIG. 4. In ranging packet structure 1300, the legacy preamble includes L-STF 1305, L-LTF 1310, and L-SIG 1315 to accommodate devices that implement legacy 802.11 technologies such as IEEE 802.11a/g/n/ac. Devices that implement legacy 802.11 technologies such as IEEE 802.11ax may determine a duration of ranging packet structure 1300 by analyzing HE-SIGA 1325 and/or L-SIG 1315. HE-SIGB may be omitted. Once the duration of ranging packet structure 1300 is known, the devices implementing legacy 802.11 technologies may defer channel access. Thus, ranging packet structure 1300 for HEz includes waveform 1335 that enables secure channel estimation and that compatibly coexists with devices implementing legacy 802.11 technologies (e.g., wireless communication device 165.) Automatic gain control may be recalculated based at least on HE-STF 1330 that corresponds to the physical layer format of ranging packet structure 1300.

Likewise, in ranging packet structure 1340 with a 40/80/160 MHz channel bandwidth, a waveform 1375 that enables secure channel estimation replaces HE-LTF fields (e.g., HE-LTF fields 1874 of FIG. 18.) Waveform 1375 may be communication 300 of FIG. 3 or communication 400 of FIG. 4. The legacy preamble includes L-STF 1345a, L-LTF 1350a, L-SIG 1355a, and with RL-SIG 1360a, they accommodate devices that implement legacy 802.11 technologies such as IEEE 802.11a/g/n/ac. Devices that implement legacy 802.11 technologies such as IEEE 802.11ac/ax may determine a duration ranging packet structure 1340 by analyzing HE-SIGA 1365a and/or L-SIG 1355a. HE-SIGB may be omitted. Note that the legacy preamble, RL-SIG, and HE-SIGA fields are duplicated over each 20 MHz channel as noted for example, by Dup L-STF 1345b, Dup L-LTF 1350b, Dup L-SIG 1355b, RL-SIG 1360b, and Dup HE-SIGA 1365b, etc. Once the duration of ranging packet structure 1340 is known, the devices implementing legacy 802.11 technologies may defer channel access. Thus, ranging packet structure 1340 for HEz includes waveform 1375 that enables secure channel estimation and that compatibly coexists with devices implementing legacy 802.11 technologies (e.g., wireless communication device 165.) Automatic gain control may be recalculated based at least on HE-STF 1370 that corresponds to the physical layer format of ranging packet structure 1340.

Figure 14:
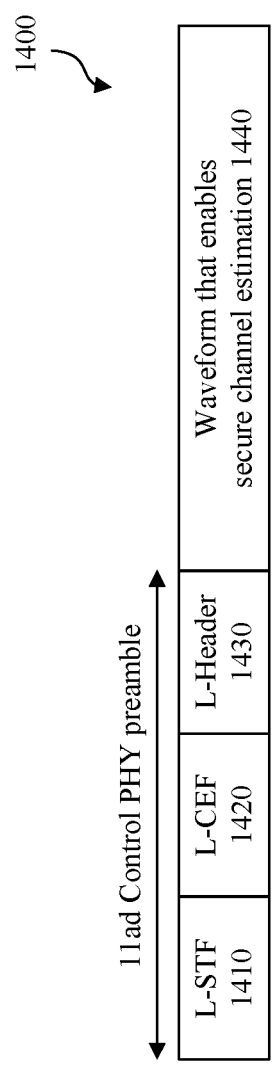
FIG. 14 illustrates example ranging packet structure for Directional Multi Gigabit z (DMGz) for 2.16 GHz channel bandwidth, according to some embodiments of the disclosure.

FIG. 14 illustrates example ranging packet structure 1400 for Directional Multi Gigabit z (DMGz) for 2.16 GHz channel bandwidth, according to some embodiments of the disclosure. DMGz ranging packet structures may be implemented at 60 GHz frequencies. In some embodiments, a control physical layer (PHY) format is implemented for ranging packet structure 1400. The control physical layer format enables longer operating distances and has similar ranging accuracy as an SC PHY and an OFDM PHY. In some embodiments, ranging packet structure 1400 includes IEEE 802.11ad control PHY preamble such as L-STF 1410, L-CEF 1420, and L-Header 1430 to accommodate devices that implement legacy 802.11 technologies such as IEEE 802.11ad. Waveform 1440 that supports secure channel estimation follows the IEEE 802.11ad control PHY preamble. An IEEE 802.11ad device, for example a station that implements legacy technology IEEE 802.11ad, may receive ranging packet structure 1400 and determine a duration of ranging packet structure 1400 by analyzing L-Header 1430. For example, the length field in L-Header 1430 may be analyzed. Once the duration of ranging packet structure 1400 is known, the IEEE 802.11ad device may correctly defer channel access. Thus, ranging packet structure 1400 for DMGz includes waveform 1440 that enables secure channel estimation and that compatibly coexists with devices implementing legacy 802.11 technologies (e.g., wireless communication device 165.) Waveform 1440 may be communication 300 of FIG. 3 or communication 400 of FIG. 4. In some embodiments, SC PHY formats may be applied.

Figure 15:
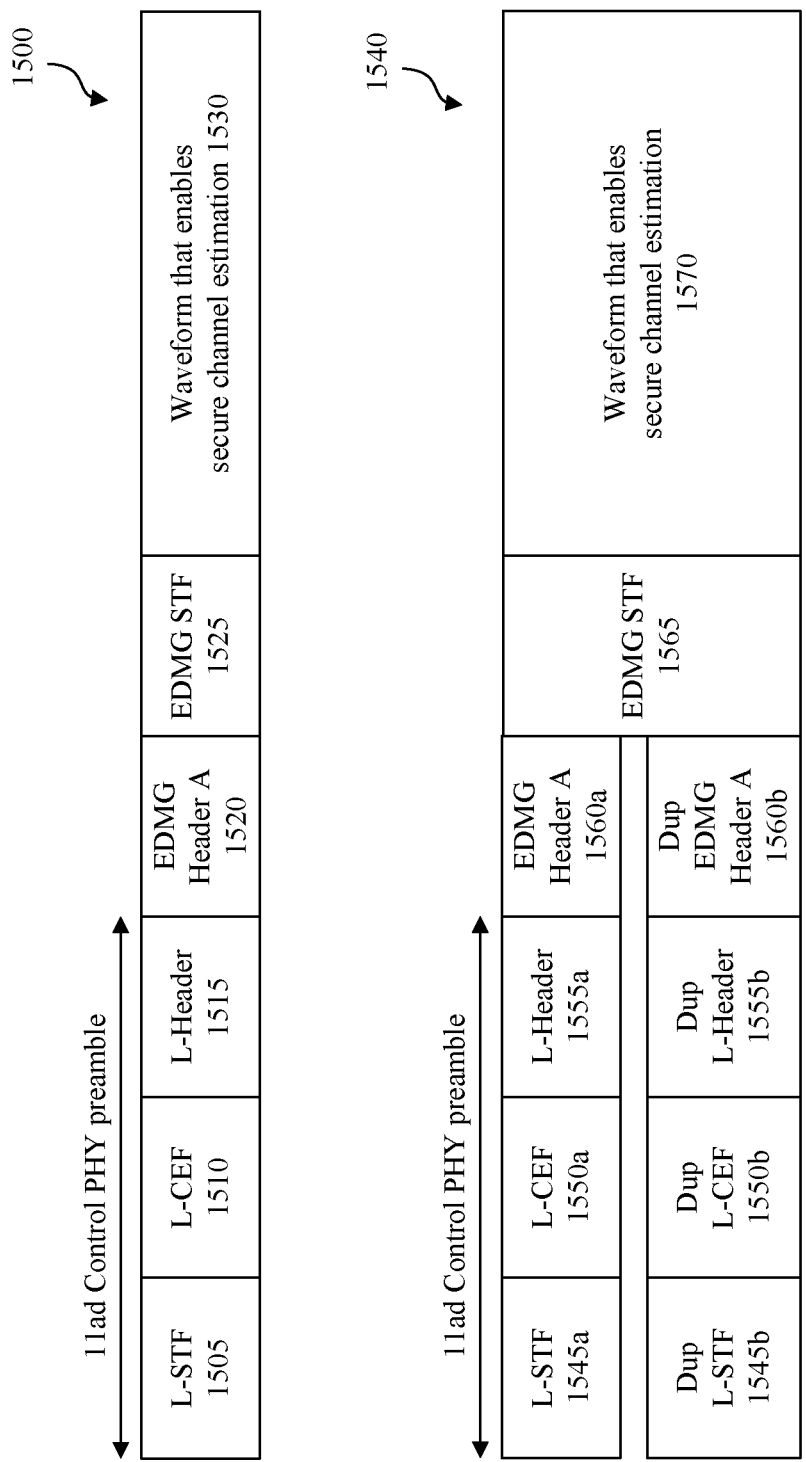
FIG. 15 illustrates example ranging packet structures for Enhanced Directional Multi Gigabit z (EDMGz) for 2.16 GHz and 4.32 GHz channel bandwidths, according to some embodiments of the disclosure.

FIG. 15 illustrates example ranging packet structure 1500 for Enhanced Directional Multi Gigabit z (EDMGz) for 2.16 GHz channel bandwidths and ranging packet structure 1540 for 4.32 GHz channel bandwidths, according to some embodiments of the disclosure. EDMGz ranging packet structures may be implemented at 60 GHz frequencies. In some embodiments, ranging packet structure 1500 includes a waveform 1530 that enables secure channel estimation and that replaces the EDMG-CEF (e.g., EDMG-CEF 2030 of FIG. 20.) Waveform 1530 may be communication 300 of FIG. 3 or communication 400 of FIG. 4. Ranging packet structure 1500 also includes IEEE 802.11ad control PHY preamble followed by EDMG Header A 1520, and EDMG-STF 1525. In some embodiments ranging, packet structure 1500 includes IEEE 802.11ad control PHY preamble such as L-STF 1505, L-CEF 1510, and L-Header 1515 to accommodate devices that implement legacy 802.11 technologies such as IEEE 802.11ad. Devices that implement legacy 802.11 technologies such as IEEE 802.11ay may determine a duration of ranging packet structure 1500 by analyzing L-Header 1515 and/or EDMG-Header-A 1520. Once the duration of ranging packet structure 1500 is known, the devices implementing legacy 802.11 technologies (e.g., IEEE 802.11ay) may defer channel access. Thus, ranging packet structure 1500 for EDMGz includes waveform 1530 that enables secure channel estimation and that compatibly coexists with devices implementing legacy 802.11 technologies (e.g., wireless communication device 165.) Automatic gain control may be recalculated based at least on EDMG-STF 1525.

Likewise, in ranging packet structure 1540 with a 4.32 GHz channel bandwidth, waveform 1570 that enables secure channel estimation replaces the EDMG-CEF (e.g., EDMG-CEF 2030 of FIG. 20.) Waveform 1570 may be communication 300 of FIG. 3 or communication 400 of FIG. 4. The IEEE 802.11ad control PHY preamble includes L-STF 1545*a*, L-CEF 1550*a*, and L-Header 1555*a* to accommodate devices that implement legacy 802.11 technologies such as IEEE 802.11ad. Devices that implement legacy 802.11 technologies such as IEEE 802.11ay may determine a duration of ranging packet structure 1540 by analyzing L-Header 1555*a* and/or EDMG-Header-A 1560*a*. Note that the IEEE 802.11ad control PHY preamble, namely, L-STF 1545*a*, L-CEF 1550*a*, and L-Header 1555*a* fields as well as EDMG-Header-A 1560*a* are duplicated over each 2.16 GHz channel as noted for example, by Dup L-STF 1545*b*, Dup L-CEF 1550*b*, and Dup L-Header 1555*b* fields as well as Dup EDMG-Header-A 1560*b*. Once the duration of ranging packet structure 1540 is known, the devices implementing legacy 802.11 technologies (e.g., IEEE 802.11ay) may defer channel access. Thus, ranging packet structure 1540 for EDMGz includes waveform 1570 that enables secure channel estimation and that compatibly coexists with devices implementing legacy 802.11 technologies (e.g., wireless communication device 165.) Automatic gain control may be recalculated based at least on EDMG-STF 1565.

Figure 16:
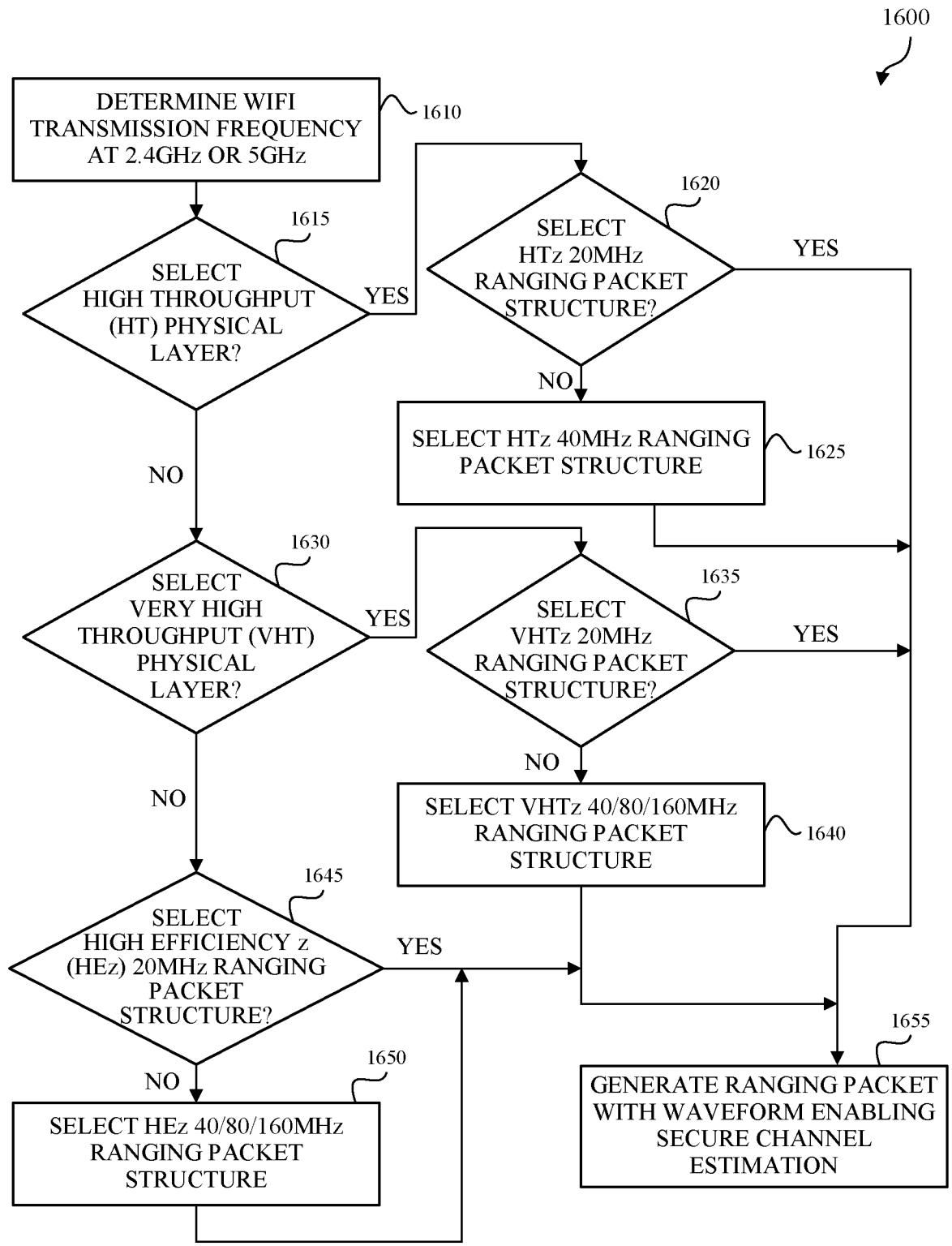
FIG. 16 illustrates an example method performed by a transmitter of a wireless ranging system with secure channel estimation at 2.4 GHz or 5 GHz, according to some embodiments of the disclosure.

FIG. 16 illustrates an example method 1600 performed by a transmitter of a wireless ranging system with secure channel estimation at 2.4 GHz or 5 GHz, according to some embodiments of the disclosure. As a convenience and not a limitation, FIG. 16 may be described with regard to elements of FIGS. 1-15. Method 1600 may be performed by system 200 of FIG. 2 and may describe 705 and/or 727 of FIG. 7.

Method 1600 begins at 1610 where system 200 determines a WiFi transmission frequency of 2.4 GHz or 5 GHz for transmitting a ranging packet that includes a waveform that enables secure channel estimation.

At 1615 a determination is made whether a high throughput (HT) physical layer is selected. When a HT physical layer is selected, method 1600 proceeds to 1620. Otherwise, method 1600 proceeds to 1630.

At 1620, a determination is made whether an HTz 20 MHz ranging packet structure is selected. When an HTz 20 MHz ranging packet structure is selected, method 1600 proceeds to 1655. Otherwise, method 1600 proceeds to 1625.

At 1625 method 1600 selects an HTz 40 MHz ranging packet structure and proceeds to 1655.

At 1655, method 1600 generates a ranging packet with the waveform enabling secure channel estimation utilizing the selected ranging packet structure.

Returning to 1630, a determination is made whether a very high throughput (VHT) physical layer is selected. When a VHT physical layer is selected, method 1600 proceeds to 1635. Otherwise, method 1600 proceeds to 1645.

At 1635, a determination is made whether a VHTz 20 MHz ranging packet structure is selected. When a VHTz 20 MHz ranging packet structure is selected, method 1600 proceeds to 1655. Otherwise, method 1600 proceeds to 1640.

At 1640, method 1600 selects a VHTz 40 MHz ranging packet structure and proceeds to 1655.

Returning to 1645, a determination is made whether a high efficiency z (HE) 20 Mz ranging packet structure is selected. When an HEz 20 MHz ranging packet structure is selected, method 1600 proceeds to 1655. Otherwise, method 1600 proceeds to 1650.

At 1650, method 1600 selects an HEz ranging packet structure corresponding to a channel bandwidth of 40/80/160 MHz, and proceeds to 1655. Method 1600 ends.

Figure 17:
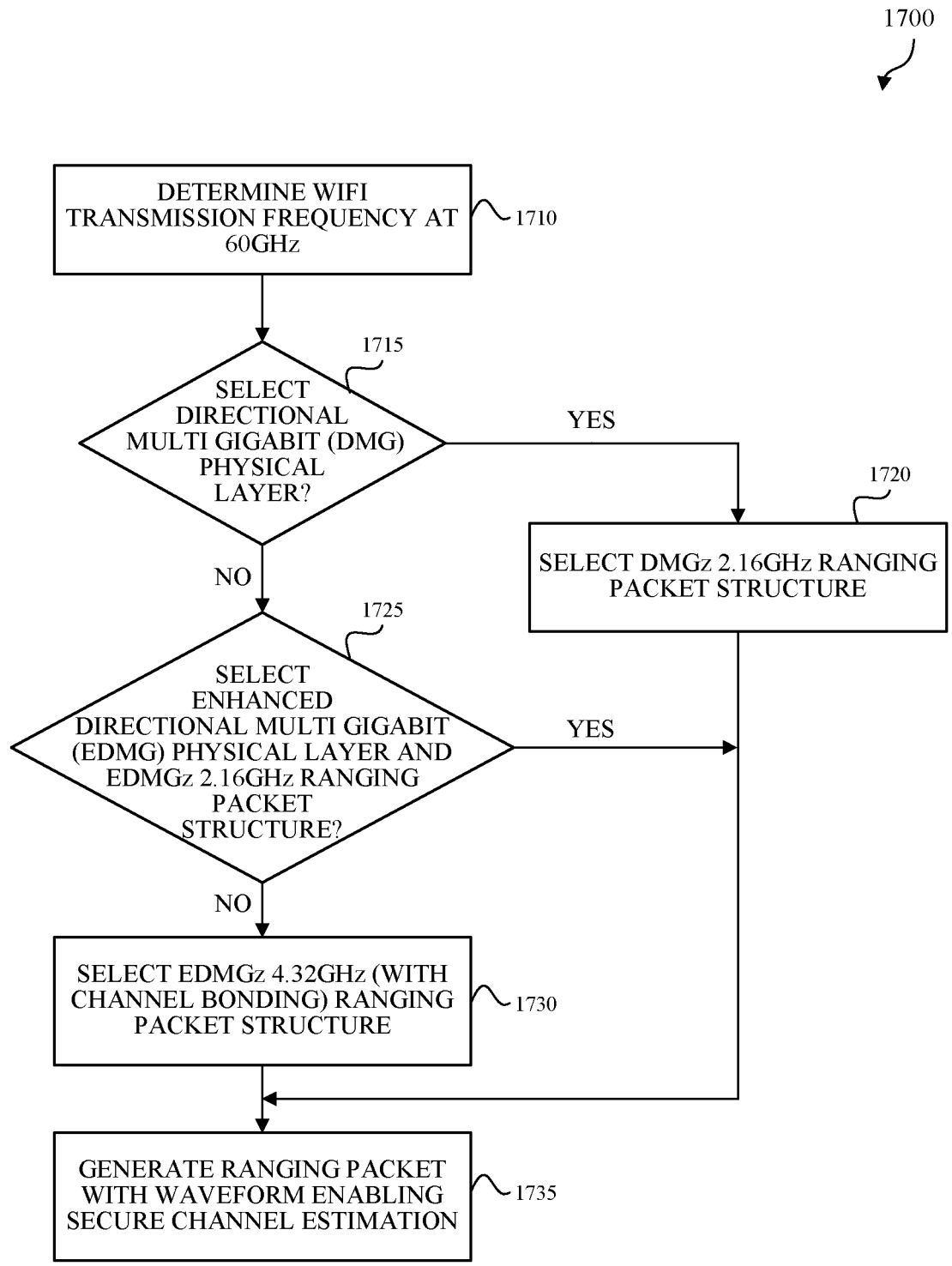
FIG. 17 illustrates an example method performed by a transmitter of a wireless ranging system with secure channel estimation at 60 GHz, according to some embodiments of the disclosure.

FIG. 17 illustrates an example method 1700 performed by a transmitter of a wireless ranging system with secure channel estimation at 60 GHz, according to some embodiments of the disclosure. As a convenience and not a limitation, FIG. 17 may be described with regard to elements of FIGS. 1-15. Method 1700 may be performed by system 200 of FIG. 2 and may describe 705 and/or 727 of FIG. 7.

Method 1700 begins at 1710 where system 200 determines a WiFi transmission frequency of 60 GHz for transmitting a ranging packet that includes a waveform that enables secure channel estimation.

At 1715, a determination is made whether a directional multi gigabit (DMG) physical layer is selected. When a DMG physical layer is selected, method 1700 proceeds to 1720. Otherwise, method 1700 proceeds to 1725.

At 1720, method 1700 selects a DMGz 2.16 GHz ranging packet structure. Method 1700 proceeds to 1735.

At 1735, method 1700 generates a ranging packet with the waveform enabling secure channel estimation utilizing the selected ranging packet structure.

Returning to 1725, a determination is made whether an enhanced directional multi gigabit (EDMG) physical layer and EDMGz 2.16 GHz ranging packet structure are selected. When an EDMG physical layer and EDMGz 2.16 GHz ranging packet structure are selected, method 1700 proceeds to 1735. Otherwise, method 1700 proceeds to 1730.

At 1730, method 1700 selects an EDMGz 4.32 GHz ranging packet structure with channel bonding. Method 1700 proceeds to 1735. Method 1700 ends.

Figure 8:
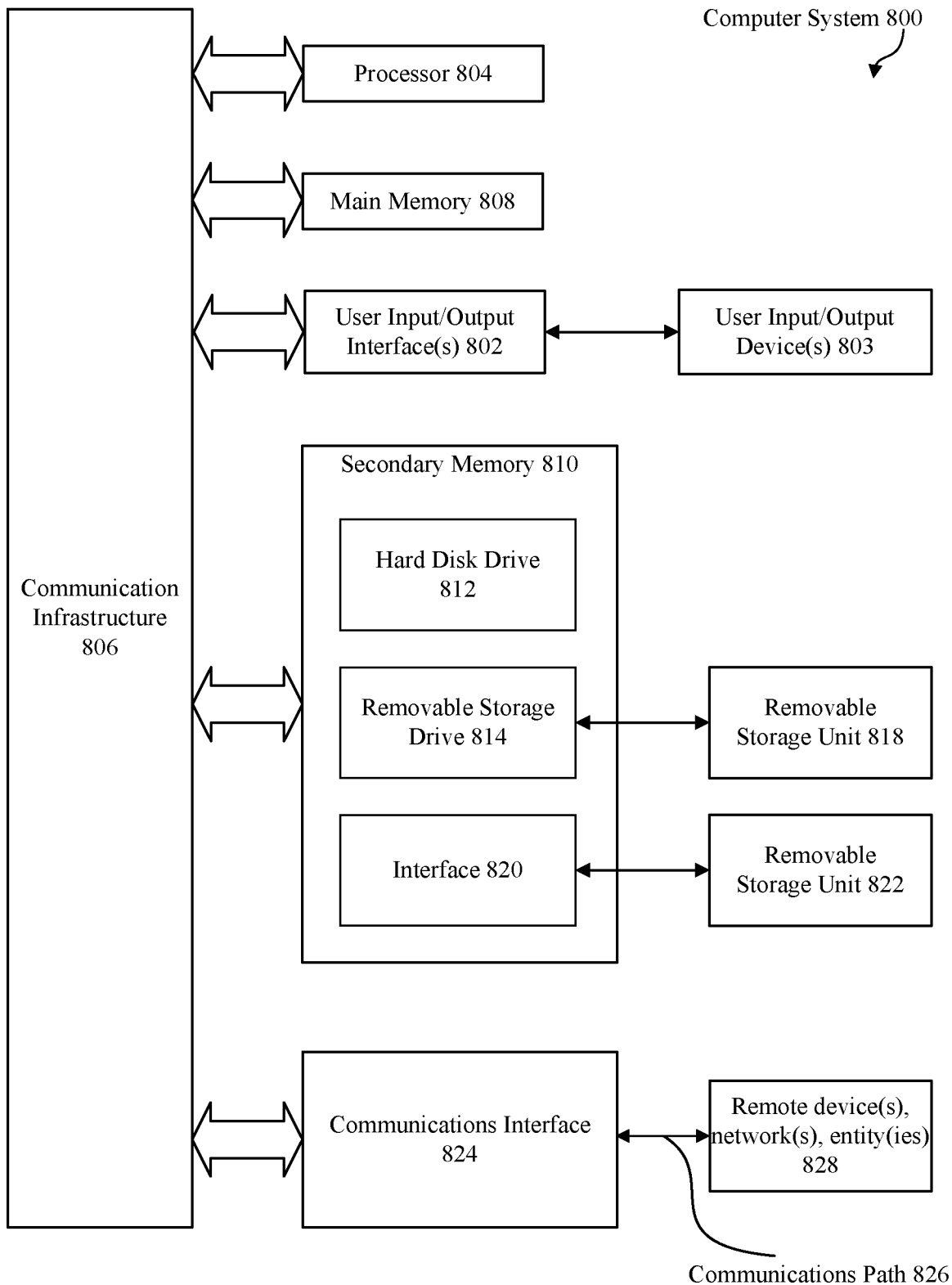
FIG. 8 is an example computer system for implementing some embodiments or portion(s) thereof.

Various embodiments can be implemented, for example, using one or more computer systems, such as computer system 800 shown in FIG. 8. Computer system 800 can be any well-known computer capable of performing the functions described herein. For example, and without limitation, electronic devices such as laptops, desktops as described with regard to FIG. 1 and/or other apparatuses and/or components shown in the figures. The laptops and desktops or other wireless devices may include the functions as shown in system 200 of FIG. 2 and/or some or all of methods 700, 750, 1600, 1700 of FIGS. 7A, 7B, 16, and 17 respectively. For example, computer system 800 can be used in wireless devices to exchange ranging packet structures that include waveforms that enable secure channel estimation between wireless devices.

Computer system 800 includes one or more processors (also called central processing units, or CPUs), such as a processor 804. Processor 804 is connected to a communication infrastructure or bus 806. Computer system 800 also includes user input/output device(s) 803, such as monitors, keyboards, pointing devices, etc., that communicate with communication infrastructure 806 through user input/output interface(s) 802. Computer system 800 also includes a main or primary memory 808, such as random access memory (RAM). Main memory 808 may include one or more levels of cache. Main memory 808 has stored therein control logic (e.g., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to some embodiments, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

The operations in the preceding embodiments can be implemented in a wide variety of configurations and architectures. Therefore, some or all of the operations in the preceding embodiments may be performed in hardware, in software or both. In some embodiments, a tangible apparatus or article of manufacture includes a tangible computer useable or readable medium having control logic (software) stored thereon is also referred to herein as a computer program product or program storage device. This includes, but is not limited to, computer system 800, main memory 808, secondary memory 810 and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 8. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. An electronic device for transmitting a ranging packet structure with a waveform that enables secure channel estimation, comprising:
a memory; and
one or more processors communicatively coupled to the memory and configured to:
before a ranging process, receive one or more core symbols from an other electronic device, wherein the one or more core symbols comprise one or more different training sequences;
generate the ranging packet structure comprising the waveform that enables secure channel estimation based on at least the one or more core symbols, wherein the ranging packet structure is compatible with one or more legacy technologies,
wherein the waveform comprises a first zero prefix and a first core symbol of the one or more core symbols, wherein a first length of the first zero prefix varies based at least on a length of the first core symbol; and
transmit the ranging packet structure.

2. The electronic device of claim 1, further comprising:
a symbol comprising the first zero prefix, the first core symbol of the one or more core symbols, and a first zero postfix,
wherein the first length of the first zero prefix and a length of the first zero postfix each equal a guard interval, and
wherein a sum of the length of the first core symbol and the length of the first zero postfix equals a size of a Discrete Fourier Transform (DFT) analysis window.

3. The electronic device of claim 1, wherein the one or more processors are further configured to:
determine a WiFi transmission frequency at 2.4 GHz or 5 GHz; and
select a high throughput (HT) physical layer based at least on the determination of the WiFi transmission frequency at 2.4 GHz or 5 GHz, wherein the waveform replaces a high throughput long training field (HT-LTF).

4. The electronic device of claim 3, wherein the ranging packet structure comprises: a legacy preamble, a high throughput signal field (HT-SIG), and a high throughput short training field (HT-STF).

5. The electronic device of claim 4, wherein the ranging packet structure comprises a 40 MHz bandwidth, wherein the legacy preamble and the HT-SIG are duplicated over a first 20 MHz channel and a second 20 MHz channel comprising the 40 MHz bandwidth.

6. The electronic device of claim 1, wherein the one or more processors are further configured to:
determine a WiFi transmission frequency at 2.4 GHz or 5 GHz; and
select a very high throughput (VHT) physical layer based at least on the determination of the WiFi transmission frequency at 2.4 GHz or 5 GHz, wherein the waveform replaces a very high throughput long training field (VHT-LTF).

7. The electronic device of claim 6, wherein the ranging packet structure comprises: a legacy preamble, a very high throughput signal field A (VHT-SIGA), and a very high throughput short training field (VHT-STF), wherein a very high throughput signal field B (VHT-SIGB) is omitted.

8. The electronic device of claim 7, wherein the ranging packet structure comprises one of a 40 MHz, an 80 MHz, or a 160 MHz bandwidth and wherein the legacy preamble and the VHT-SIGA are duplicated over each 20 MHz channel of the 40 MHz, the 80 MHz, or the 160 MHz bandwidth.

9. The electronic device of claim 1, wherein the one or more processors are further configured to:
determine a WiFi transmission frequency at 2.4 GHz or 5 GHz; and
select a very high efficiency (HE) physical layer based at least on the determination of the WiFi transmission frequency at 2.4 GHz or 5 GHz, wherein the waveform replaces a high efficiency long training field (HE-LTF).

10. The electronic device of claim 9, wherein the ranging packet structure comprises: a legacy preamble, a repeated legacy signal field (RL-SIG), a high efficiency signal field A (HE-SIGA), and a high efficiency short training field (HE-STF).

11. The electronic device of claim 10, wherein the ranging packet structure comprises one of a 40 MHz, an 80 MHz, or a 160 MHz bandwidth and wherein the legacy preamble, the RL-SIG, and the HE-SIGA are duplicated over each 20 MHz channel of the 40 MHz, the 80 MHz, or the 160 MHz bandwidth.

12. The electronic device of claim 1, wherein the one or more processors are further configured to:
determine a WiFi transmission frequency at 60 GHz; and
select a directional multi gigabit (DMG) physical layer based at least on the determination of the WiFi transmission frequency at 60 GHz, wherein the waveform follows an 801.11ad control physical layer preamble comprising a legacy header (L-Header).

13. The electronic device of claim 1, wherein the one or more processors are further configured to:
determine a WiFi transmission frequency at 60 GHz; and
select an enhanced directional multi gigabit (EDMG) physical layer based at least on the determination of the WiFi transmission frequency at 60 GHz, wherein the waveform replaces an enhanced directional multi gigabit channel estimation field (EDMG-CEF).

14. The electronic device of claim 13, wherein the ranging packet structure comprises: an 801.11ad control physical layer preamble, an EDMG-Header-A, and an EDMG short training field (EDMG-STF).

15. The electronic device of claim 14, wherein:
the ranging packet structure comprises a 4.32 GHz bandwidth; and
the 801.11ad control physical layer preamble, the EDMG-Header-A, and the EDMG-STF are duplicated over each 2.16 GHz channel of the 4.32 GHz bandwidth.

16. A method for transmitting a ranging packet structure with a waveform that enables secure channel estimation, comprising:
receiving one or more core symbols from an other electronic device, wherein the one or more core symbols comprise one or more different training sequences;
generating the ranging packet structure comprising the waveform that enables secure channel estimation based at least on the one or more core symbols, wherein the ranging packet structure is compatible with one or more legacy technologies, and wherein the waveform comprises a symbol comprising a first zero prefix, a first core symbol of the one or more core symbols, and a first zero postfix, wherein a first length of the first zero prefix varies based at least on a length of the first core symbol; and transmitting the ranging packet structure.

17. The method of claim 16, wherein a length of the first zero postfix equals a guard interval, wherein the length of the first zero postfix equals the first length of the first zero prefix, and wherein a sum of the length of the first core symbol and the length of the first zero postfix equals a size of a Discrete Fourier Transform (DFT) analysis window.

18. A non-transitory computer-readable medium having instructions stored therein, which when executed by one or more processors in an electronic device cause the one or more processors to perform operations for transmitting a ranging packet structure with a waveform that enables secure channel estimation, the operations comprising:

receiving one or more core symbols from an other electronic device, wherein the one or more core symbols comprise one or more different training sequences;

generating the ranging packet structure comprising the waveform that enables secure channel estimation based at least on the one or more core symbols, wherein the ranging packet structure is compatible with one or more legacy technologies, wherein the one or more legacy technologies do not support the waveform that enables secure channel estimation, and wherein the waveform comprises a first zero prefix and a first core symbol of the one or more core symbols, wherein a first length of the first zero prefix varies based at least on a length of the first core symbol; and transmitting the ranging packet structure.

19. The non-transitory computer-readable medium of claim 18, wherein the waveform comprises:

a symbol comprising the first zero prefix, the first core symbol of the one or more core symbols, and a first zero postfix, wherein a length of the first zero postfix equals a guard interval, wherein the length of the first zero postfix equals the first length of the first zero prefix, and wherein a sum of the length of the first core symbol and the length of the first zero postfix equals a size of a Discrete Fourier Transform (DFT) analysis window.

20. The non-transitory computer-readable medium of claim 18, wherein operations further comprise:

determining a WiFi transmission frequency at 2.4 GHz or 5 GHz; and selecting a high throughput (HT) physical layer based at least on the determination of the WiFi transmission frequency at 2.4 GHz or 5 GHz, wherein the waveform replaces a high throughput long training field (HT-LTF).

21. The wireless electronic device of claim 1, wherein the waveform further comprises a second core symbol of the one or more core symbols and a second zero prefix, wherein a second length of the second zero prefix is different than the first length of the first zero prefix.

22. The method of claim 16, wherein the waveform further comprises a second core symbol of the one or more core symbols and a second zero prefix, wherein a second length of the second zero prefix is different than the first length of the first zero prefix.

23. The non-transitory computer-readable medium of claim 18, wherein the waveform further comprises a second core symbol of the one or more core symbols and a second zero prefix, wherein a second length of the second zero prefix is different than the first length of the first zero prefix.

* * * * *